(12) United States Patent
Sugimoto

(10) Patent No.: US 7,698,404 B2
(45) Date of Patent: Apr. 13, 2010

(54) STATUS INFORMATION NOTIFICATION SYSTEM

(75) Inventor: Tasuku Sugimoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1115 days.

(21) Appl. No.: 10/895,390

(22) Filed: Jul. 21, 2004

(65) Prior Publication Data

US 2005/0021728 A1    Jan. 27, 2005

(30) Foreign Application Priority Data

Jul. 23, 2003    (JP)    ............... 2003-278288

(51) Int. Cl.
G06F 15/173    (2006.01)
(52) U.S. Cl. ................. 709/223; 709/203; 709/217; 709/219; 709/224
(58) Field of Classification Search ............. 709/203, 709/217–219, 223–224
See application file for complete search history.

(56) References Cited

U.S. PATENT DOCUMENTS

| | | | | |
|---|---|---|---|---|
| 5,937,148 | A * | 8/1999 | Okazawa | 358/1.13 |
| 6,115,132 | A * | 9/2000 | Nakatsuma et al. | 358/1.14 |
| 6,314,476 | B1 | 11/2001 | Ohara | |
| 6,459,496 | B1 * | 10/2002 | Okazawa | 358/1.14 |
| 6,807,907 | B2 * | 10/2004 | Yamada | 101/484 |
| 6,829,059 | B1 * | 12/2004 | Kimura | 358/1.15 |
| 6,903,830 | B1 | 6/2005 | Hane et al. | |
| 7,246,225 | B2 * | 7/2007 | Cheshire | 713/1 |
| 2004/0004732 | A1 * | 1/2004 | Takeda et al. | 358/1.13 |
| 2007/0038877 | A1 * | 2/2007 | Cheshire | 713/300 |

FOREIGN PATENT DOCUMENTS

| | | |
|---|---|---|
| EP | 0 526 189 A2 | 2/1993 |
| EP | 0 657 846 A2 | 6/1995 |
| EP | 0 759 590 A1 | 2/1997 |
| EP | 1 199 879 A2 | 4/2002 |
| JP | 7-281794 | 10/1995 |
| JP | 11-252119 | 9/1999 |
| JP | A HEI 11-252119 | 9/1999 |
| JP | A 2000-141821 | 5/2000 |
| JP | A 2000-316064 | 11/2000 |
| JP | A 2000-326590 | 11/2000 |
| JP | A 2001-130102 | 5/2001 |
| JP | A 2002-347311 | 12/2002 |
| JP | A 2002-354166 | 12/2002 |

* cited by examiner

Primary Examiner—Shawki S Ismail
(74) Attorney, Agent, or Firm—Oliff & Berridge, PLC

(57) ABSTRACT

A status information notification system includes a network terminal device and a communication processing device that enables the network terminal device to communicate with another terminal device through a communication network. The network terminal device includes a terminal controlling system that controls processing of functional units and outputs status information representing operational status of the network terminal device, and a sleeping system that lowers a power consumption of the terminal control system when a predetermined condition is satisfied. The communication processing device has an examining system that examines whether a request for the status information is received from the another terminal device. A communication controlling system obtains the status information from a storing system or the terminal controlling system, and transmits the obtained status information to the communication network. The status information is obtained from the storing system when the terminal control system is in the sleep status.

18 Claims, 16 Drawing Sheets

FIG. 3

| UNIT | ITEM | STATE |
|---|---|---|
| PANEL | DISPLAY POWER<br>KEY PERMISSION | ON<br>READY |
| PRINT ENGINE | POWER<br>TRAY 1 SHEET<br>TRAY 2 SHEET<br>TONER CARTRIDGE<br>TONER AMOUNT | READY<br>OK<br>EMPTY<br>ATTACHED<br>3% |
| SENSOR UNIT | COVER 1<br>COVER 2<br>SHEET JAM | CLOSE<br>CLOSE<br>OK |

STATUS INFORMATION NOTIFICATION SYSTEM

BACKGROUND OF THE INVENTION

The present invention relates to a status information notification system for a network, in which a status of a network terminal is notified to anther terminal. The present invention also relates to the network terminal and a communication processing device constituting the status information notification system.

Conventionally, a plurality of terminals such as computers and printers are connected with a communication network such as a LAN (Local Area Network), and signals are exchanged therebetween through the LAN.

There is known a printer having a function of notifying its operational status to another terminal device. When such a printer is connected to the communication network as one of the terminals, the operational status of such a printer can be transmitted to another terminal device directly or via a printer server.

An example of such a network is disclosed in Japanese Patent Provisional Publication No. HEI 11-252119. According to the publication, a terminal device (e.g., a management device, computer or the like) can obtain the operational status information of a printer connected to the network through a printer server. In such a system, the print server issues request to the printer for the latest operational status whenever the status of the printer changes to obtain and accumulate the status information. It is examined whether the request from the terminal device is for the status information directly directed to the printer, or the accumulated status information in the printer server, and if the direct request to the printer, the print server obtains the status from the printer and then transmits the status information to the terminal. If the request is for the accumulated data, the print server transmits the accumulated status information to the terminal.

In the network system as discloses in the above-indicated publication, the printer needs to respond to a request for the status information from other terminal devices. Therefore, even if the printer is not required to carry out a printing operation, power should be continuously supplied to CPU and RAM which are used for controlling the operation of the printer. Therefore, the printer is impossible to operate in a so-called sleep mode, which makes it difficult to reduce the power consumption of the printer.

SUMMARY OF THE INVENTION

The present invention is advantageous in that the status information can be notified to other terminals with allowing the printer to operate in the sleep mode when the printing operation need not be carried out.

According to an aspect of the invention, there is provided a status information notification system including a network terminal device and a communication processing device that enables the network terminal device to communicate with another terminal device through a communication network. The network terminal device is provided with a terminal controlling system that controls processing or functional units provided to the network terminal device and outputs status information representing operational status of the network terminal device, and a sleeping system that lowers a power consumption of the terminal control system when a predetermined condition is satisfied. The communication processing device is provided with a storing system that stores the status information output by the terminal controlling system when the predetermined condition is satisfied, a determining system that determines whether the terminal controlling system is in the sleep condition, an examining system that examines whether a request for the status information is received from the another terminal device, and a communication controlling system that obtains the status information from one of the storing system and the terminal controlling system, and transmits the obtained status information to the communication network. The communication controlling system is configured to obtain the status information from the storing system when the determining system determines that the terminal control system is in the sleep status, and outputs the status information to the network.

Optionally, the communication controlling system may be configured to obtain the status information from the terminal controlling system when the determining system determines that the terminal controlling system is not in the sleep status, and transmits the status information to the communication network.

Further, the communication controlling system may be configured to access the storing system regardless whether the terminal controlling system is in the sleep status or non-sleep status.

Still optionally, the storing system may include a common storage that is accessible from both the terminal controlling system and the communication controlling system.

In a particular case, the sleeping system sets the terminal controlling system in the sleep status when the predetermined condition is satisfied and the terminal controlling system has completed outputting the status information to the common storage.

Optionally, the communication controlling system may obtain the status information from the terminal controlling system and stores the obtained status information in the storing system.

In this case, the communication controlling system may be configured to include a completion notification system that notifies a completion notification notifying that storing the status information in the storing system has been completed to the sleeping system, and the sleeping system may transit the status of the terminal controlling system to the sleeping state when the completion notification is notified from the completion notification system.

Further optionally, the terminal controlling system may include a main control system and a terminal storing system that stores the status information every time when the status of the network terminal device changes. The main control system may be configured to output the status information stored in the terminal storing system to the communication controlling system in response to a request from the communication controlling system.

In this case, the terminal storing system may be connected with the main control system with a data bus. Further, the main control system may be configured to release the data bus in response to a request from the communication controlling system so that the communication controlling system can access the terminal storing system through the data bus. The communication controlling system may be configured to obtain the status information from the terminal storing system when the main control system releases the data bus.

Still optionally, the predetermined condition may include a condition where an input through one of the communication network and an inputting system provided to or the network terminal device is not made for a predetermined time period.

Further optionally, the predetermined condition may include a condition where an input instructing a transition into the sleep status is made through one of the communication network and an inputting system provided to or the network terminal device.

Furthermore, the sleeping system may be configured to notify the determining system when the terminal controlling system is set to operate in the sleep status and when the terminal controlling system is set to recover from the sleep status, and the determining system may determine whether the terminal controlling system operates in the sleep status in accordance with the notification from the sleeping system.

Optionally, the terminal controlling system may be configured to make at least one of the functional units operate in the sleep status in which the power consumption is lower than in the normal state when the terminal controlling system transits into the sleep status.

Further optionally, the terminal controlling system may include a monitoring system that monitors an interruption signal input to the terminal controlling system from one of the communication network and an input system provided to the network terminal device, and the sleeping system may be configured to make functions other that the function of the monitoring system to bring the terminal controlling system into an inoperable state.

Optionally, the sleeping system may make the terminal controlling system recover from the sleep status when the monitoring system detects the interruption signal input to the terminal controlling system.

In a particular case, the network terminal device may be a printer, and the interruption signal is a print request signal transmitted from the another terminal device.

Still optionally, the terminal controlling system may operate synchronously with an operation clock for synchronizing operations among circuits included in the terminal controlling system. Further, the terminal controlling system may include an internal clock controlling system that controls a frequency of the operational clock. Furthermore, the internal clock controlling system may be configured to lower the frequency of the operation clock when the terminal controlling system is set to the sleep status, the internal clock controlling system recovers the frequency of the operation clock when the terminal controlling system is recovered from the sleep status.

In a particular case, the communication controlling system may operate regardless the change of the frequency of the operation clock by the internal clock controlling system of the terminal controlling system.

Still optionally, each of the functional units may be provided with a unit clock controlling system that controls, according to instructions of the terminal controlling system, the frequency of the operation clock for synchronizing operations of the circuits in each functional unit, and the terminal controlling system may be configured to instruct the unit clock controlling system of one of the functional units to lower the frequency of the operation clock when entering the sleep status, and to recover the frequency of the operation clock when recovering from the sleep status.

Further optionally, the communication processing device may be provided inside a casing of the network terminal device.

According to another aspect of the invention, there is provided a network terminal device for a status information notification system including the network terminal device and a communication processing device that enables the network terminal device to communicate with another terminal device through a communication network.

The network terminal device includes a terminal controlling system that controls processing or functional units provided to the network terminal device and outputs status information representing operational status of the network terminal device, and a sleeping system that lowers a power consumption of the terminal control system when a predetermined condition is satisfied.

In this case, the communication processing device may be provided with a storing system that stores the status information output by the terminal controlling system when the predetermined condition is satisfied, a determining system that determines whether the terminal controlling system is in the sleep condition, an examining system that examines whether a request for the status information is received from the another terminal device, and a communication controlling system that obtains the status information from one of the storing system and the terminal controlling system, and transmits the obtained status information to the communication network, and wherein the communication controlling system obtains the status information from the storing system when the determining system determines that the terminal control system is in the sleep status, and outputs the status information to the network.

According to a further aspect of the invention, there is provided a communication processing device for a status information notification system including a network terminal device and the communication processing device, the communication processing device enabling the network terminal device to communicate with another terminal device through a communication network, the network terminal device including a terminal controlling system that controls processing or functional units provided to the network terminal device and outputs status information representing operational status of the network terminal device, and a sleeping system that lowers a power consumption of the terminal control system when a predetermined condition is satisfied.

The communication processing device may be provided with a storing system that stores the status information output by the terminal controlling system when the predetermined condition is satisfied, a determining system that determines whether the terminal controlling system is in the sleep condition, an examining system that examines whether a request for the status information is received from the another terminal device, and a communication controlling system that obtains the status information from one of the storing system and the terminal controlling system, and transmits the obtained status information to the communication network. Further, the communication controlling system is configured to obtain the status information from the storing system when the determining system determines that the terminal control system is in the sleep status, and outputs the status information to the network.

According to a furthermore aspect of the invention, there is provided a computer program product having computer readable instructions that cause a computer system to function as a status information notification system including a network terminal device and a communication processing device that enables the network terminal device to communicate with another terminal device through a communication network.

The function of the network terminal device may include a terminal controlling system that controls processing or functional units provided to the network terminal device and outputs status information representing operational status of the network terminal device, and a sleeping system that lowers a power consumption of the terminal control system when a predetermined condition is satisfied.

Further, the function of the communication processing device may include a storing system that stores the status information output by the terminal controlling system when the predetermined condition is satisfied, a determining system that determines whether the terminal controlling system is in the sleep condition, an examining system that examines whether a request for the status information is received from the another terminal device, and a communication controlling system that obtains the status information from one of the storing system and the terminal controlling system, and transmits the obtained status information to the communication network. The communication controlling system may be configured to obtain the status information from the storing system when the determining system determines that the terminal control system is in the sleep status, and output the status information to the network.

According to a furthermore aspect of the invention, there is provided a status information notification system including a network terminal device and a communication processing device that enables the network terminal device to communicate with another terminal device through a communication network. The network terminal device may include a sleeping system that controls the terminal control system to operate in a low power consumption mode when a predetermined condition is satisfied, and the communication processing device may include a storing system that stores the status information output by the terminal controlling system when the predetermined condition is satisfied, a status obtaining system that obtains the status information from the storing system when the terminal control system operates in the low power consumption mode, the status obtaining system obtaining the status information from the terminal control system when the terminal control system operates in a normal mode, and a status transmitting system that outputs the status information obtained by the status obtaining system to the network.

According to a further aspect of the invention, there is provided a status information notification system including a network terminal device and a communication processing device that enables the network terminal device to communicate with another terminal device through a communication network. The network terminal device may include an operational unit that operates to realize a predetermined function, a terminal control system that controls operations of the operational unit, the terminal device being operable in a sleep mode, in which both the operational unit and the terminal control system operate in a low power consumption mode, when a predetermined condition is satisfied. Further, the terminal control system operates in a normal mode, when a status request is received, with maintaining the operational unit to operate in the low power consumption mode, and the communication processing device may include a status obtaining system that obtains the status information from terminal control system regardless whether the terminal device operates in the sleep mode, and a status transmitting system that outputs the status information obtained by the status obtaining system to the network.

BRIEF DESCRIPTION OF THE ACCOMPANYING DRAWINGS

FIG. 1 schematically shows a configuration of a communication network to which embodiments of the present invention can be applied;

FIG. 3 is a table illustrating an example of status information;

DETAILED DESCRIPTION OF THE EMBODIMENTS

Referring to the accompanying drawings, communication network systems according to embodiments of the present invention and a modification thereof will be described in detail.

<Configuration of Communication Network>

Figure 1:
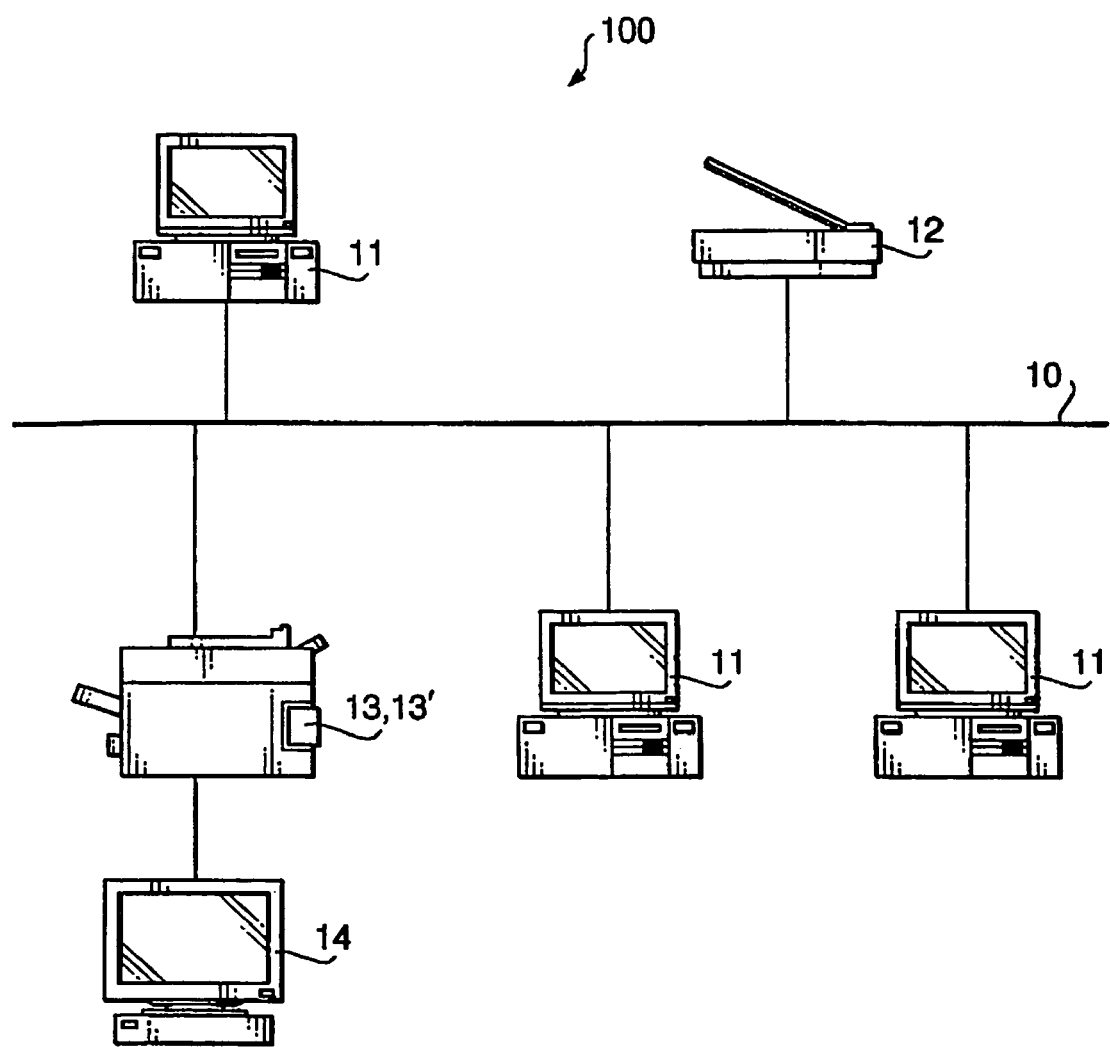

FIG. 1 shows a configuration of a communication network 100 to which status notifying systems according to embodiments of the invention are applicable.

As shown in FIG. 1, the communication network 100 includes a LAN (Local Area Network) 10. A data processing devices 11 which are network terminal devices, a scanner 12, printer 13 are connected to the LAN 10 such that a bi-directional communication can be done therebetween.

In the following description, as an example of a network terminal device as well as a communication processing device, the printer 13 will be referred to and described. Of course, the printer is an only an example, and any other network terminal device can be subject to the notification system described herein. According to the second embodiment, similarly to the above, the printer 13' will be described as an example of the network terminal device/communication processing device. Since the overall configuration of the communication network according to the first embodiment is similar to that of the second embodiment, FIG. 1 will be referred to both for the first and second embodiment, a reference number 13 of the printer being for the first embodiment and a reference number 13' for the second embodiment.

The data processing device 11, which is another terminal connected to the LAN 10, is configured such that various types of data is input and processed. The data processing device 11 creates print data including character data and/or image data, and transmits the same to the printer 13 through the LAN 10. The data processing device 11 also functions to transmit a status information obtaining command in accordance with an SNMP (Simple Network Management Protocol) to obtain status information representative of the operational status of the printer 13.

The printer 13 is a multi-function printer having a scanner function and facsimile function as well as the printer function. As a printer, the printer 13 receives various print data and print the image. According to the first embodiment, the printer is connected to the LAN 10 as a network printer, and is also connected to a host computer 14 as a local printer thereof.

First Embodiment

Network Terminal Device/Communication Processing Device

Figure 2:
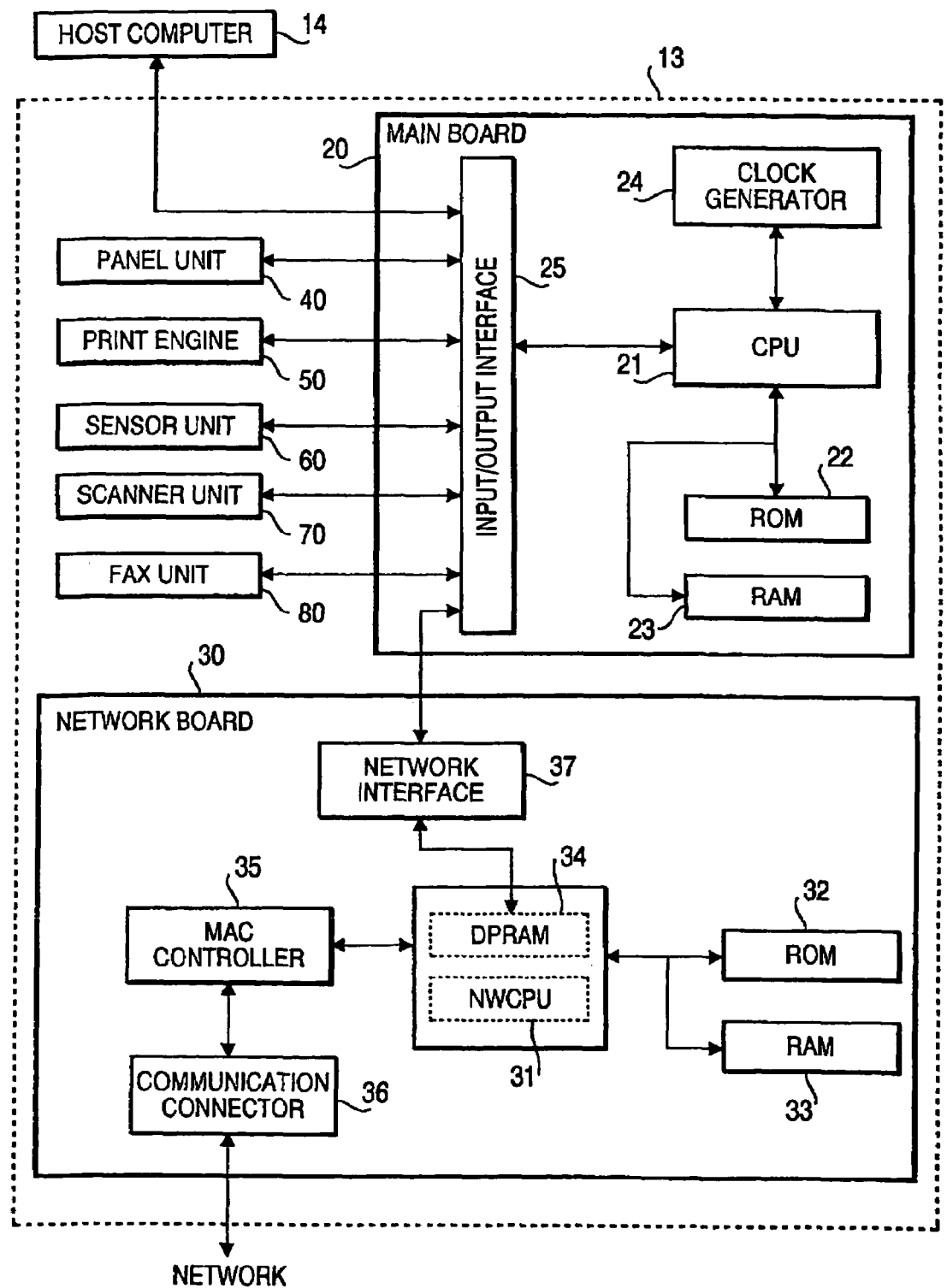
FIG. 2 is a block diagram of a printer according to the first embodiment.

FIG. 2 shows a block diagram of the printer 13, which is a network terminal device according to the first embodiment.

The printer 13 includes, as shown in FIG. 2, a main board 20 implemented with a terminal controller that controls an entire operation of the printer 13, a network board 30 (which is a communication controlling device) implemented with a communication controller, a panel unit 40 which is a user interface provided with a liquid crystal display and input keys, a print engine 50 that prints out images based on the received print data, a sensor unit 60 for detecting operational status of the printer 13, a scanner unit 70 and a facsimile unit 80. According to the first embodiment, the network board 30 is provided inside the network terminal device unitarily, which constitutes a status information notifying system.

<Mine Board>

The main board 20 has a CPU (Central Processing Unit) 21, a ROM (Read Only Memory) 22, a RAM (Random Access Memory) 23, a clock generator 24 that generates a synchronizing signal (clock) for synchronous operation of the circuits of the terminal controller, and an input/output interface 25 serves as input/output ports of signals transmitted between the main board 20 and external devices. Each of the CPU 21, ROM 22, RAM 23, clock generator 24 and input/output interface 25 are connected with a data bus having a plurality of signal lines. In the drawings referred to hereinafter, the CPU 21 is occasionally referred to simply as a main CPU.

One signal line (an interruption signal line) of the plurality of signal lines constituting the data bus connecting the CPU 21 and I/O interface 25 is used for inputting an interruption signal, which is generated in response to a signal input from the LAN 10, host computer 14 or panel unit 40, is input to the CPU 21. The CPU 21 has a built-in external interruption buffer which is a circuit for monitoring the interruption signal, and to the external interruption buffer is connected with the interruption signal line. The external interruption buffer is a circuit which stops the operation of the CPU 21 and allows the CPU 21 to received a newly introduced input signal. It should be note that the external interruption buffer operates even when the CPU 21 operates in a sleep condition. As the interruption signal input to the CPU 21, a print request signal, a status information request signal, and a sleep condition release signal which is input based on the input to the panel unit 40.

As well as the above-described interruption signal line, data signal lines through which data signals are transmitted/received with respect to the ROM 22 and/or RAM 23 are connected to the CPU 21. The CPU 21 is therefore provided with a plurality of external buffers (including the above-described external interruption buffer) for receiving and processing the data signals.

The CPU 21 controls functional units such as a panel unit 40, a print engine 50 and a sensor unit in accordance with various pieces of data stored in the ROM 22. Further, the CPU 21 obtains data representing the operational status of each functional unit every time when a functional unit has been changed or periodically, and stores the obtained data as status information. Further, the CPU 21 retrieves the status information stored in the RAM 23 in accordance with a request by the NWCPU 31 (described later), and outputs the retrieved information.

The CPU 21 functions to set the operational status of each functional unit described above or the terminal controller into a sleep mode when a predetermined condition is satisfied. The predetermined condition may include a condition where data is not input for a predetermined time period, or a predetermined key operation has been made in the panel unit 40. It should be noted that the sleep mode or sleep condition is a condition where power supply is minimized and only the power necessary for re-start of the terminal controller is applied to reduce the power consumption of each functional unit and device.

When operating in the sleep mode, the CPU 21 monitors only a manual operation by the user through the external interruption buffer or interruption signal such as a print command signal. When the interruption signal is input to the external interruption buffer when the CPU 21 operates in the sleep mode, the CPU 21 operates to release the sleep mode. Note that the functional unit that can operate in the sleep mode can be selected/changed by the user. Further, when the operational status of the CPU 21 is changed to the sleep mode, the CPU 21 retrieves the status information at the moment from the RAM 23, and outputs to the DPRAM 34 (described later), then operates in the sleep mode.

FIG. 3 shows examples of the status information stored in the RAM 23.

The status information is data representing the operational status of each functional unit. Each piece of status information is indicated by items and states thereof for each unit. For example, for the functional unit of "PRINT ENGIN" 50, the items include absence/presence of power supply (POWER), absence/presence of recording sheet in a sheet tray (TRAY 1 SHEET; TRAY 2 SHEET), attached/detached state of a toner cartridge (TONER CARTRIDGE), and a remaining amount of toner (TONER AMOUNT). For example, according to FIG. 3, the remaining toner amount is 3%. The each piece of status information stored in the RAM 23 is updated, as each state is changed, by the CPU 21 on ITEM basis.

The clock generator 24 shown in FIG. 2 generates an operation clock, which is a clock signal referred to by each circuit of the terminal controller for synchronization between the circuits. The CPU 21 and other circuits operate to process data synchronously with the operation clock. Generally, the higher the frequency of the operation clock is, the higher the data processing speed is. On the other hand, the higher the frequency of the operation clock is, the greater the power consumption in each circuit is. Therefore, unless a large amount of data is to be processed, it is preferable that the frequency of the operation clock is lowered. The clock generator 24 is configured such that the frequency of the operation clock is changed under control of the CPU 21. It should also be noted that, similar clock generator (not shown) is provided in each functional unit, each clock generator being configured to vary the frequency of the operation clock under control of the CPU 21.

<Network Board>

Next, the network board 30 will be described with reference to FIG. 2. The network board 30 is a communication processing device including an NWCPU (NetWork-CPU) 31 which is a CPU especially dedicated for communication procedure, a ROM 32 and a RAM 33, a DPRAM 34 which is a readable/writable storage having two accessing ports, a MAC controller 35 which performs the communication control in accordance with a Media Access Control (MAC) process, a communication connector 36 functions as an external communication port and a network interface 37 that is a communication interface with the main board 20.

The NWCPU 31 is an operation device realized by ASIC (Application Specific Integrated Circuit), and performs the communication control in accordance with the data stored in the ROM 32. The NWCPU 31 further has a function to determine whether the notification request of the status information is received from the data processing device 11, and a function of obtaining the status information from the CPU 21 of the DPRAM 34 (described later) in response to the request, and transmit the obtained status information to the data processing device.

The NWCPU 31 further has a function of determining whether the terminal controller (e.g., CPU 21) operates in the sleep status. When the terminal controller operates in the seep mode, the NWCPU 31 transmits the status information stored in the DPRAM 34, while when the terminal controller operate in the normal mode (i.e., non-sleep mode), it requests the CPU 21 for the status information, and transmits the status information newly obtained and transmitted from the CPU 21.

The DPRAM (Dual Port RAM) 34 has two access ports in the ASIC where the NWCPU 31 is provided, and its storage area is shared by a plurality of CPUs. According to the first embodiment, the DPRAM 34 is accessed by the CPU 21 and the NWCPU 31, and functions to allow data exchange between the CPU 21 and the NWCPU 31. Specifically, the DPRAM 34 includes a command area allowing commands to be exchanged between the CPU 21 and NWCPU 31, a data area where various types of data is stored, and a semaphore area which is accessed by the CPU 21 and the NWCPU 31 simultaneously and prevents destruction and/or inconsistency of data stored in the DPRAM 34.

The NWCPU 31 can access the DPRAM 34 when the CPU 21 operates in the sleep or non-sleep mode. Similarly, the CPU 21 can access the DPRAM 34 when the NWCPU 31 operates in the sleep mode or non-sleep mode. However, when the CPU 21 (or NWCPU 31) accesses the DPRAM 34, the NWCPU 31 (or CPU 21) cannot read data or write data from/to the semaphore area (i.e., the semaphore is not open), the NECPU 31 (or CPU 21) cannot access the command area or the data area. When the semaphore area is open (i.e., reading/writing data in the semaphore area is allowed), the NWCPU 31 (CPU 21) can access the command area or the data area. When the NWCPU 31 (CPU 21) is accessing the command or data area, a flag is set to the semaphore area indicating the data or command area is currently accessed, and when the access to the DPRAM 34 is completed, the NWCPU 31 (or CPU 21) returns the flag in the semaphore area to the initial value (i.e., open the semaphore area).

In the command area of the DPRAM 34, commands such as a command notifying the NWCPU 31 that the operation mode of the CPU 21 is changed to the sleep mode, and a command with which the NWCPU 31 request the CPU 21 for the status information are written. The commands written in the command area is automatically notified to the NWCPU 31 or the CPU 21. Alternatively or optionally, the CPU 21 and/or the NWCPU 31 may read out the commands stored in the command area at certain timings and execute operations in accordance with the commands.

In the data area, various data such as the status information written by the CPU 21 is stored, the data stored in the data area being used as common data for the CPU 21 and the NWCPU 31. In other words, the communication between the CPU 21 and NWCPU 31 is performed by means of the DPRAM 34.

The MAC controller 35 monitors a communication condition (traffic) of the LAN 10, and when traffic of the LAN 10 is relatively low, the MAC controller 35 starts data transmission/reception to be done. The MAC controller 35 stores a unique hardware address with which the MAC controller 35 can be identified in the network, and when the MAC controller 35 is called through the LAN 10, it can keep the communicating status.

<Operation of Network Terminal Device>

Next, procedures of the printer 13 according to the first embodiment will be described with reference to flowcharts shown in FIGS. 4-8.

Figure 4:
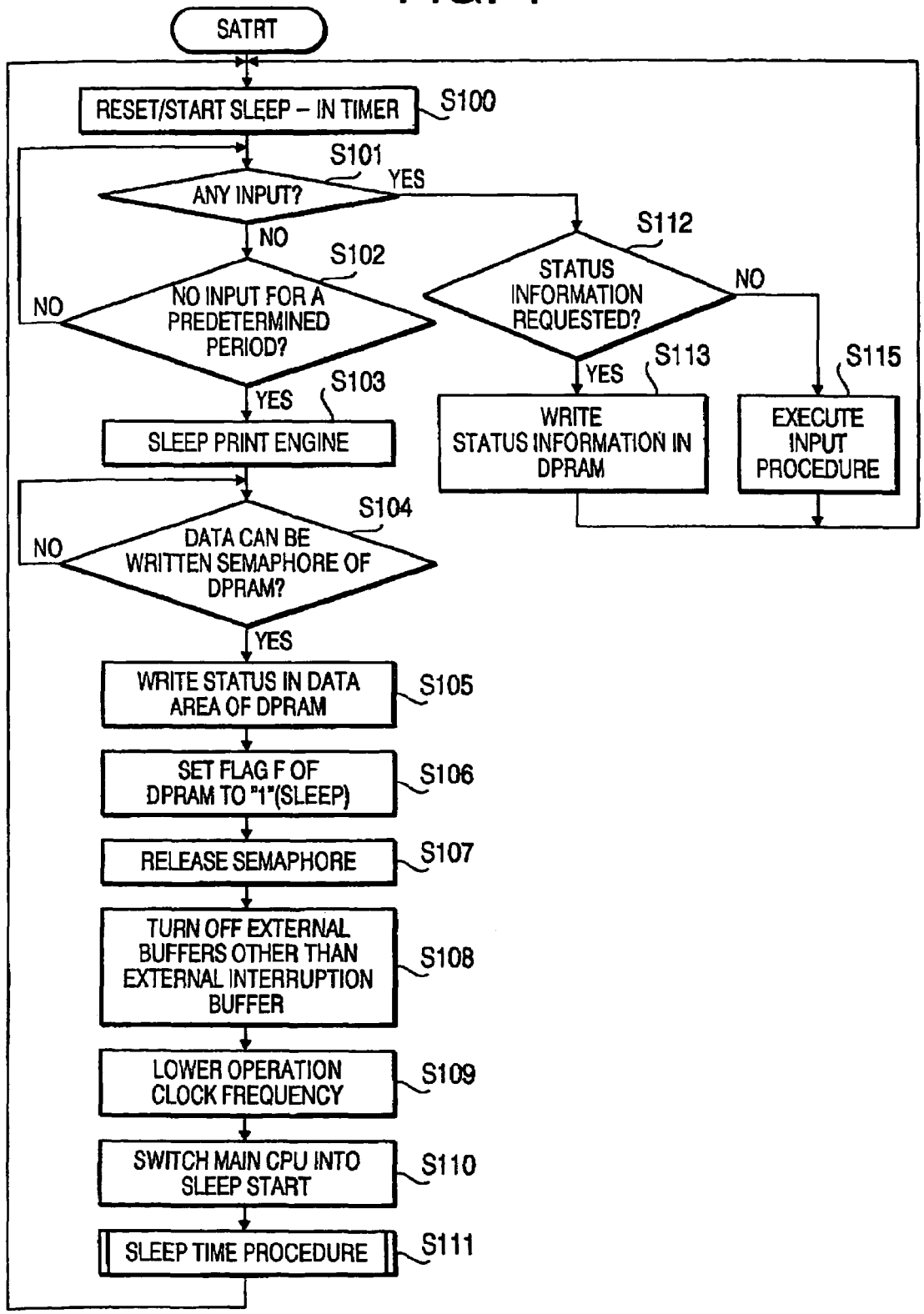
FIG. 4 is a flowchart illustrating a main procedure executed by a CPU of the printer, according to the first embodiment.

FIG. 4 shows a flowchart of a main procedure executed by the CPU 21. In the first embodiment, when the operational mode of the printer 13 transits to the sleep mode, the operation mode of the print engine 50 also transits to the sleep mode.

<Main Procedure>

In S100 (FIG. 4), the CPU 21 resets a sleep-in timer to zero. The sleep-in timer is for measuring a time period during which input operations for control the functional units are not performed. When the no-input period lasts for a predetermined period, the operation mode of the CPU 21 is changed to the sleep mode. In S101, the CPU 21 monitors whether there is an input operation through the panel unit 40 or an external input (e.g., through the network). When no input is detected (S101: NO), process determines whether the predetermined period has elapsed (S102). When the predetermined period has not elapsed (S101: NO), process returns to S101, and keeps monitoring whether an input is detected. When the predetermined period has elapsed (S102: YES), process proceeds to change the operation mode into the sleep mode.

Firstly, the CPU 21 set the operation mode of the print engine 50 to the sleep mode (S103). Then, heater and fan (not shown) of the print engine 50 are stopped, thereby power consumption being largely decreased.

Next, the CPU 21 performs a writing operation to the semaphore of the DPRAM 34. Specifically, the CPU 21 determines whether the semaphore is open (S104). When the CPU 21 is unable to write data in the semaphore (S104: NO), the NWCPU 31 is accessing the DPRAM 34. In such a case, process repeats S104 until the CPU 21 can write data in the semaphore (i.e., the NWCPU 31 releases the semaphore). When the CPU 21 can write data in the semaphore (S104: YES), the CPU 21 reads out the status information stored in the RAM 23, and writes the status information in the data area of the DPRAM 34 (S105). According to the first embodiment, the status information is written in the DPRAM 34 which can be directly accessed by the NWCPU 31, it becomes possible that the operation mode of the CPU 21 is changed to the sleep mode when the status information is stored in the DPRAM 34.

Next, the CPU 21 sets a flag F, which is provided at a predetermined address in the data area of the DPRAM 34, to one (1) in S106. The flag F indicates whether the printer is in the sleep status or not. When the flag F is zero, the printer operates in the sleep mode, while when the flag F is one, the printer operates in the normal mode.

When the above writing operation is completed, the CPU 21 releases the semaphore (i.e., allows the NWCPU 31 to access the DPRAM 34) in S107.

It should be noted that when the CPU 21 or NWCPU 31 accesses the DPRAM 34, the following proceedings are performed. That is, when the CPU 21 or the NWCPU 31 accesses the DPRAM 34, as described above, the attempt to access is repeated until the semaphore is released. When the semaphore is released, reading/writing of the data in the data area of the DPRAM 34 is allowed. Further, when the read/write of the data in the data area of the DPRAM 34 is completed, the CPU 21 or the NWCPU 31 releases the semaphore. For the sake of brevity, the proceedings will not be described in the description hereafter.

When the CPU 21 finishes writing the status data in the data area of the DPRAM 34, the CPU 21 switches the operational statuses of external buffers other than the interruption buffer that monitors the operation of the user and/or reception of the interrupting signal such as a print instruction signal to OFF status (S108). The external buffers include, for example, a buffer that processes data to be displayed on the liquid crystal display of the panel unit 40. Since the display of the liquid crystal display is stopped, the power consumption for the LCD is saved.

Next, the CPU 21 outputs instructions of lowering the frequency of the clock to the clock generator 24 and other clock generators respectively for the print engine 50, the scanner unit 70 and the facsimile unit 80 (S109). As described above, the CPU 21 and other circuits operate in accordance with the operation clocks generated by the clock generators. By lowering the frequency of the operation clock, the number of processes per unit time is reduced, which reduces the power consumption. It should be noted that, the NWCPU 31 is not affected by the change of the operational clock of the clock generator 24. Therefore, even though the CPU 21 lowers the clock frequency and operate in the sleep mode, the NWCPU 31 operates in the normal mode and can perform the communication procedure normally.

As described above, when a preparation to transit to the sleep mode is completed, the CPU 21 changes its operation mode to the sleep mode (S110). Then, process proceeds to S111 where a sleep condition procedure is executed.

In S101, when the CPU 21 operates in the normal mode and there is an input to the CPU 21 (S101 YES), process determines whether the input is for requesting the status information coming from the NWCPU 31 (S111).

When there is a request for the status information coming from the NECPU 31 (S112: YES), the CPU 21 retrieves the status information from the RAM 23, and stores the same to the data area of the DPRAM 34 (S113). Thereafter, process returns to S100. When the input detected in S101 is not the request for the status information (S112: NO), the CPU 21 executes a process according to the input command (S114). Thereafter, process returns to S100. The command other than the status information request may be the print instruction command. In such a case, the CPU 21 instructs the print engine 50 to carry out the printing operation in accordance with the print data.

<Sleep Condition Procedure>

The operation of the CPU 21 when the printer operates in the sleep mode will be described with reference to FIG. 5, which is a flowchart showing the sleep condition procedure executed by the CPU 21.

In S120, the external interruption buffer of the CPU 21 monitors whether an external interruption signal is received from the outside (S120). When no external interruption signal is received (S120: NO), process repeats S120 to continue the monitoring.

When the external interruption signal is received (S120: YES), the CPU 21 restarts itself and starts releasing the sleep condition (S121). Next, the CPU 21 transmits instructions to the clock generator 24 and other clock generators of respective functions units to return the frequencies of the operational clocks to normal values (i.e., values at the normal operation) (S122). Then, the CPU 21 returns the operational statuses (currently OFF) of the external buffers to the ON statuses (S123), and instructs to release the sleep condition of print engine 50 (S124). Then, in S125, the CPU 21 accesses the DPRAM 34 and sets the value of the flag F in the data area to zero (normal). With this process, it becomes possible that the NWCPU 31 recognizes the printer (i.e., the CPU 21 and functional units) returns from the sleep mode and operates in the normal mode. After the procedure shown in FIG. 5 is done, process returns to S100 of FIG. 4.

<Main Procedure of the NWCPU>

Figure 6:
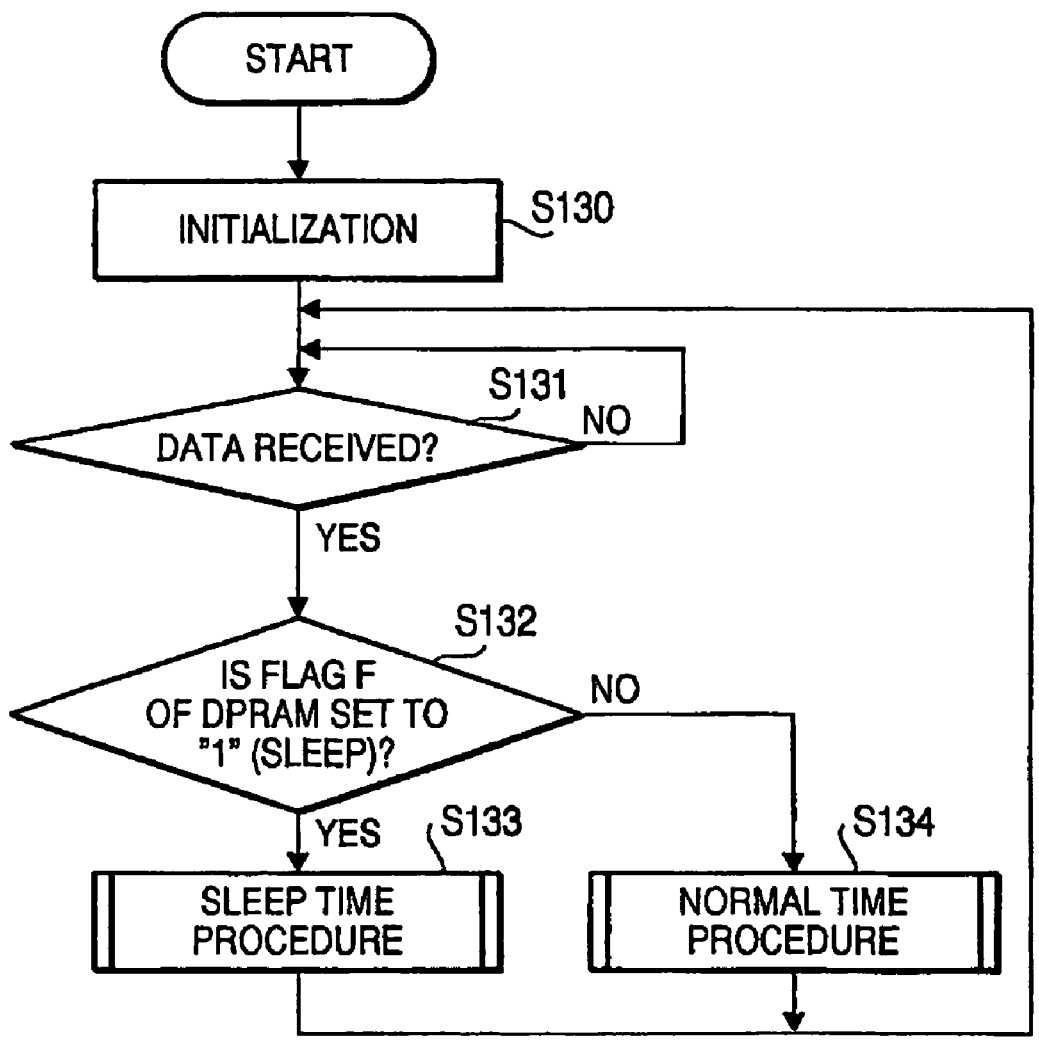
FIG. 6 is a flowchart illustrating a main procedure executed by an NWCPU according to the first embodiment.

A procedure executed by the NWCPU 31 will be described hereinafter. FIG. 6 shows a flowchart illustrating a main procedure executed by the NWCPU 31.

As shown in FIG. 6, the NWCPU 31 executes an initialization of the RAM 33, MAC controller 35 and other devices (S130). Then, the NWCPU 31 determines whether the request for the status information or print data is received from the LAN 10 (S131). Specifically, the detection of data from the LAN 10 is executed by the MAC controller 35, and the NWCPU 31 determines whether the data is received based on the signal output by the MAC controller 35. When no data is received (S131: NO), the NWCPU 31 continues monitoring the data reception (S131).

When the NWCPU 31 determines that data is received from the LAN 10 (S131: YES), the NWCPU 31 determines whether the terminal controller operates in the sleep mode (S132). When the terminal controller operates in the sleep mode (S132: YES), process proceeds to a sleep time procedure in S133. When the terminal controller is not in the sleep mode (S132: NO), process proceeds to a normal time procedure in S134.

<Sleep Time Procedure>

Figure 7:
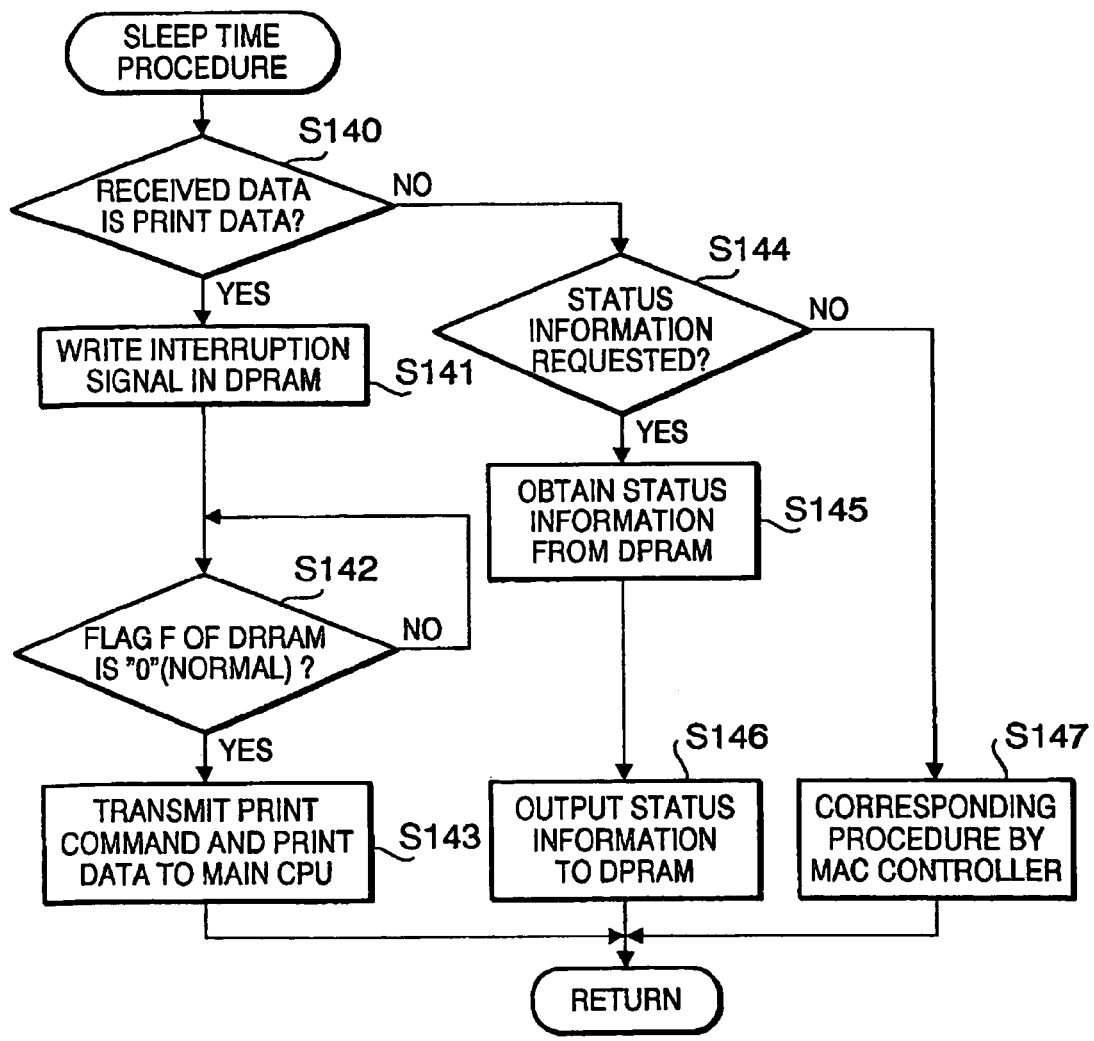
FIG. 7 is a flowchart illustrating a sleep time procedure which is executed when a main device operates in the sleep mode, according to the first embodiment.

FIG. 7 shows a flowchart illustrating the sleep time procedure which is executed in S133 of FIG. 6.

The NWCPU 31 determines whether the received data is the print data (S140). When the relieved data is the print data (S140: YES), the NWCPU 31 writes the interruption signal indicative of the reception of the print data in the command area of the DPRAM 34 (S141). Then, the NWCPU 31 monitors the data area of the DPRAM 34 and determines whether the flag F has, been changed to zero (0) by the CPU 21 (S142). It should be noted that when the flag F is rewritten to zero, the operation mode of the printer has been changed from the sleep mode to the normal mode.

When the flag F is changed to zero (S142: YES), the NWCPU 31 writes the print command and print data in the DPRAM 34 so that the CPU 21 performs the printing operation (S143) Thereafter, process moves to S131 of FIG. 6.

When the received data is not the print data (S142: NO), the NWCPU determines whether the received data is the request for the status information (S144). When the received data request for the status information (S144: YES), the NWCPU 31 obtains the status stored in the data area of the DPRAM 34 (S145), and transmits the status information to the LAN 10 via the MAC controller (S146). Thereafter, process proceeds to S131 of FIG. 6.

When the received data is not the request for the status information (S144: NO), the MAC controller performs operations corresponding to the received data. In this case, as received data, an inquiry transmitted through the LAN for the MAC address of the printer 13 may be included. When the operation corresponding to the received data in S147, process proceeds to S131 of FIG. 6.

<Normal Time Procedure>

Figure 8:
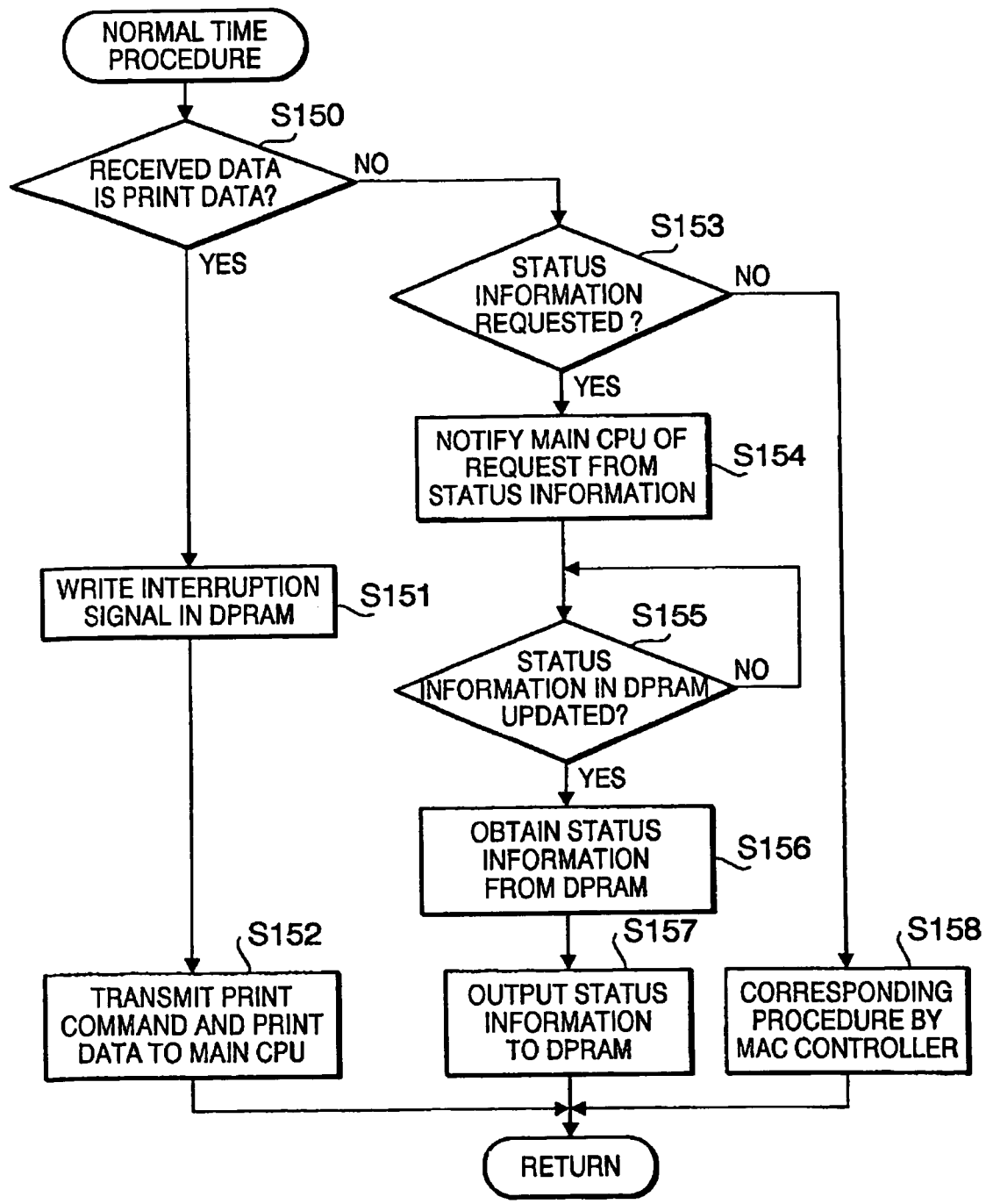
FIG. 8 shows a flowchart illustrating a procedure when the main device operate in a normal mode, according to the first embodiment.

FIG. 8 shows a flowchart illustrating the normal time procedure executed by the NWCPU 31.

The NWCPU 31 determines whether the received data is the print data (S150). When the received data is the print data (S150: YES), the NWPCU 31 write interruption signal indicative of the reception of the print data in the command area of the DPRAM 34 (S151). Then, the NWCPU 31 writes the print command and print data in the DPRAM 3e so that the CPU 21 performs the printing operation (S152). Thereafter, process proceeds to S131 of FIG. 6.

When, the received data is not the print data (S150: NO), the NWCPU 31 determines whether the received data requests for the status information (S153). When the received data requests for the status information (S153: YES), the NWCPU 31 writes command requesting for the status information in the command area of the DPRAM 34 to request the PCU 21 for the latest status information (S154). Then, the NWCPU 31 monitors the DPRAM 34 and determines whether the CPU 21 has finished writing the status information (S155). When the status information stored in the DPRAM 34 has been updated (S155: YES), the NWCPU 31 obtains the updated status information from the data area of the DPRAM 34 (S156), and transmits the status information to the LAN 10 via the MAC controller 35 (S157). After transmission, process proceeds to S131 of FIG. 6.

When the received data is not the request for the status information (S153: NO), operations corresponding to the received data are performed by the MAC controller (S158), and process proceeds to S131 of FIG. 6.

As described in detail above, in the printer 13 employing the status information notification system according to the first embodiment, when the terminal controller operates in a sleep mode, the communication controller responds to the inquiry of status information by transmitting the status information stored in the storage. Therefore, the operation mode of the terminal controller is not changed to the normal mode (i.e., the sleep mode can be maintained), and further, the status information can be transmitted. Accordingly, the power consumption is saved.

It is possible that the sleep mode of the terminal controller is released (i.e., changed to the normal mode) to obtain the latest status information every time the inquiry of the status information is received. However, if such an inquiry is received too frequently, the operation mode of the terminal device should be switched between the sleep mode and normal mode frequently. Such a switching operation may damage the printer 13 and should be avoided. According to the first embodiment, it is not necessary to release the sleep condition when the inquiry of the status information is received. Therefore, the printer 13 may not be damaged thereby.

Further, according to the status information notification system described above, and the printer does not operate in the sleep mode, the terminal controller obtains the latest status information and transmits the same in response to the inquiry received through the LAN 10.

Further, according to the status information notification system, the storage that stores the status information is configured to be commonly used storage which can be accessed by both the terminal controller and the communication controller. Therefore, regardless the communication controller is busy or not, the terminal controller can store the status information in the storage.

Furthermore, according to the status information notification system described above, the operation mode of the terminal controller can be changed to the sleep mode when the status information is stored in the storage, the power consumption can be suppressed from an early stage.

It should be noted that, in the above-described embodiment, the DPRAM 34 is used for the commonly used storage. The invention need not be limited to such a configuration and any device which realizes the similar effect can be used as the storage.

Second Embodiment

Configuration of Network Terminal Device

Hereinafter, the second embodiment will be described referring to FIGS. 9-14. According to the second embodiment, as the network terminal, a printer 13', which is a multifunctional printer similar to the printer 13 according to the first embodiment, is employed. It should be appreciated that devices and hardware constructions similar to those of the first embodiment are assigned with the same reference numbers for the sake of explanation, even if operations thereof are different, and those performing similarly as in the first embodiment will not be described for the sake of brevity.

Figure 9:
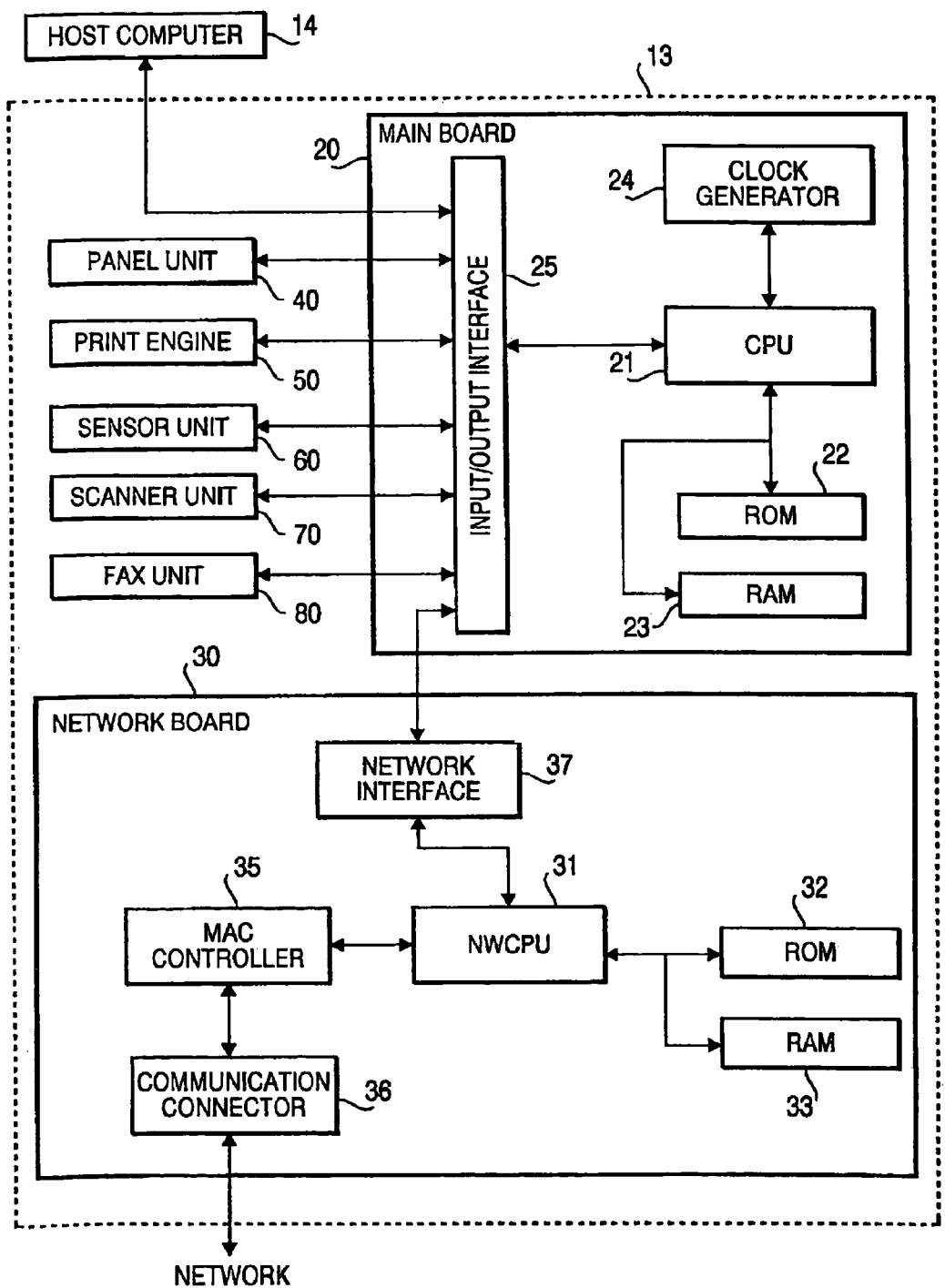
FIG. 9 is a block diagram of a printer according to a second embodiment.

FIG. 9 is a block diagram of the printer 13' according to the second embodiment.

The second embodiment is different from the first embodiment in that, as shown in FIG. 9, the common storage such as the DPRAM 34 is not employed in the second embodiment. The status information is stored in a RAM provided to the network board 30. Further, as will be described later, the communication between the CPU 21 and the NWCPU 31 is performed directly (i.e., not by way of the DPRAM 34). The NECPU 31 directly obtains the status information from the CPU 21, and stores the same in the RAM 33.

<Mine Board>

The main board 20 has a CPU (Central Processing Unit) 21, a ROM (Read Only Memory) 22, a RAM (Random Access Memory) 23, a clock generator 24 that generates a synchronizing signal (clock) for synchronous operation of the circuits of the terminal controller, and an input/output interface 25 serves as input/output ports of signals transmitted between the main board 20 and external devices. Each of the CPU 21, ROM 22, RAM 23, clock generator 24 and input/output interface 25 are connected with a data bus having a plurality of signal lines. In the drawings referred to hereinafter, the CPU 21 is occasionally referred to simply as a main CPU, and the RAM 22 is occasionally referred to as a main RAM.

The CPU 21 controls functional units such as a panel unit 40, a print engine 50 and a sensor unit in accordance with various pieces of data stored in the ROM 22. Further, the CPU 21 obtains data representing the operational status of each functional unit every time when a functional unit has been changed or periodically, and stores the obtained data as status information in the RAM 23. Further, the CPU 21 retrieves the status information stored in the RAM 23 in accordance with a request by the NWCPU 31 (described later), and outputs the retrieved information.

The CPU 21 functions to set the operational status of each functional unit described above or the terminal controller into a sleep mode when a predetermined condition is satisfied. The predetermined condition may include a condition where data is not input for a predetermined time period, or a predetermined key operation has been made in the panel unit 40.

When the operation mode is to be changed to the sleep mode, the CPU 21 notifies the NWCPU 31 that the operation mode of the CPU 21 is changed to the sleep mode. Then, the CPU 21 provides the status information stored in the RAM 23 to the NWCPU 31 in response to the request by the NWCPU 31.

<Network Board>

Next, the network board 30 will be described with reference to FIG. 9. The network board 30 is a communication processing device including an NWCPU (NetWork-CPU) 31 which is a CPU especially dedicated for communication procedure, a ROM 32 and a RAM 33, a MAC controller 35 which performs the communication control in accordance with a Media Access Control (MAC) process, a communication connector 36 functions as an external communication port and a network interface 37 that is a communication interface with the main board 20.

The NWCPU 31 performs the communication control in accordance with the data stored in the ROM 32. Similar to the first embodiment, the NWCPU 31 has a function to determine whether the notification request of the status information is received from the data processing device 11, and a function of obtaining the status information from the CPU 21 of the RAM 33 in response to the request, and transmit the obtained status information to the data processing device.

The NWCPU 31 further has a function of determining whether the terminal controller (e.g., CPU 21) operates in the sleep status. When the terminal controller operates in the seep mode, the NWCPU 31 transmits the status information stored in the RAM 33, while when the terminal controller operate in the normal mode (i.e., non-sleep mode), it request the CPU 21 for the status information, and transmits the status information newly obtained and transmitted from the CPU 21.

<Operation of Network Terminal Device>

Next, procedures of the printer 13' according to the second embodiment will be described with reference to flowcharts shown in FIGS. 10-14.

Figure 10:
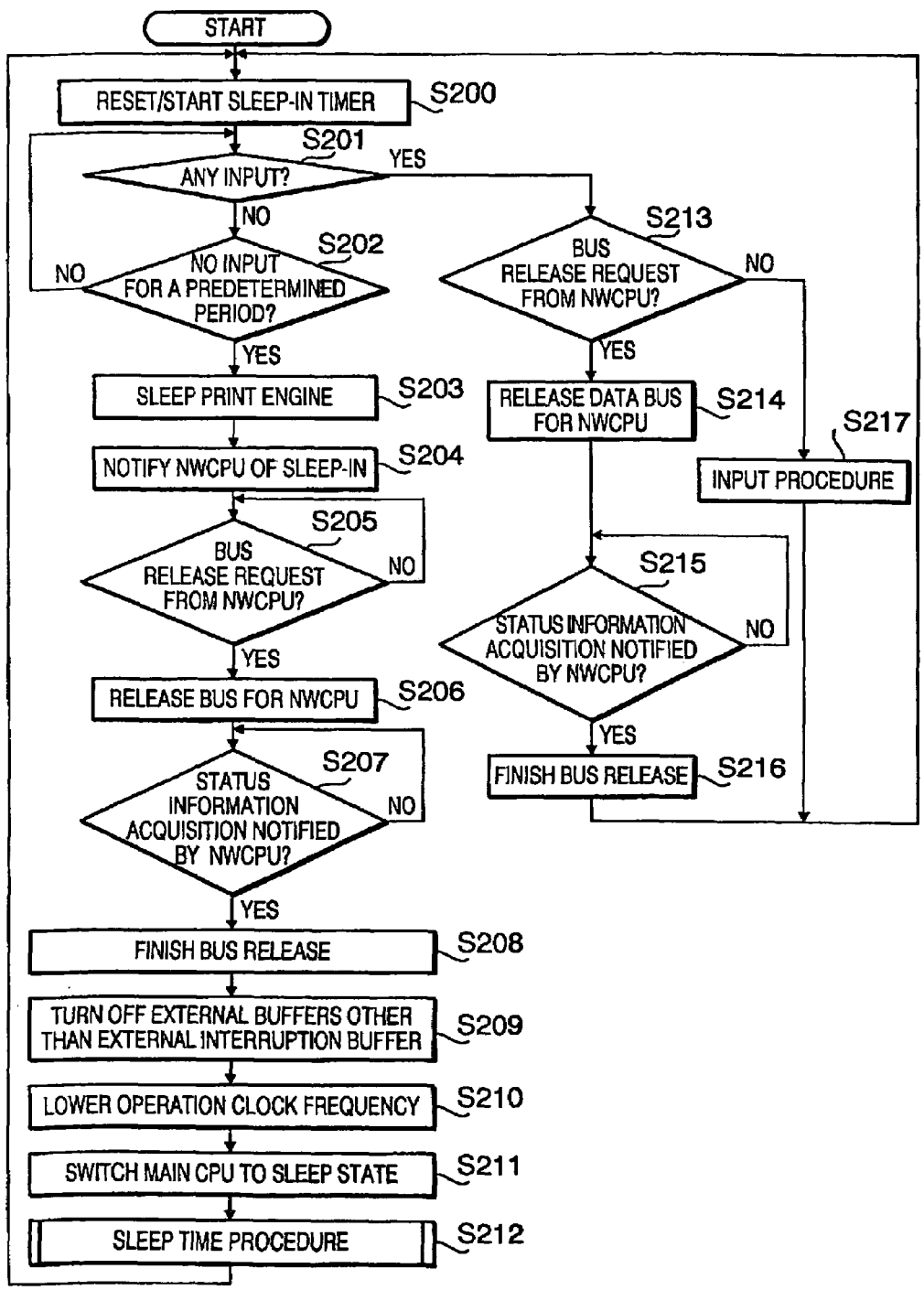
FIG. 10 is a flowchart illustrating a main procedure executed by a CPU of the printer, according to the second embodiment.

FIG. 10 shows a flowchart of a main procedure executed by the CPU 21.

<Main Procedure>

In S200 (FIG. 10), the CPU 21 resets a sleep-in timer to zero. The sleep-in timer is for measuring a time period during which input operations for control the functional units are not performed. When the no-input period lasts for a predetermined period, the operation mode of the CPU 21 is changed to the sleep mode. In S201, the CPU 21 monitors whether there is an input operation through the panel unit 40 or an external input (e.g., through the network). When no input is detected (S201: NO), process determines whether the predetermined period has elapsed (S202). When the predetermined period has not elapsed (S201: NO), process returns to S201, and keeps monitoring whether an input is detected. When the predetermined period has elapsed (S202: YES), process proceeds to change the operation mode into the sleep mode.

Firstly, the CPU 21 set the operation mode of the print engine 50 to the sleep mode (S203). Then, heater and fan (not shown) of the print engine 50 are stopped, thereby power consumption being largely decreased.

Next, the CPU 21 notifies the NWCPU 31 that the operation mode of the CPU 21 is to be changed to the sleep mode (S204). At this stage, the NWCPU 31 requests the release of the data bus for accessing the RAM 23 in response to the notification of the sleep-in.

Next, the CPU 21 determines whether the release of the bus from the NWCPU 31 is made (S205). When the NWCPU 31 requests for the release of the bus (S205: YES), the CPU 21 releases the data bus connecting the CPU 21 and the RAM 23 for the NWCPU 31 (S206). At this stage, the NWCPU 31 obtains the status information stored in the RAM 23 of the main board 20, and stores the same in the RAM 33. Then, the NWCPU 31 transmits the status information acquisition completion notification to the CPU 21. The CPU 21 monitors the reception of the status information acquisition completion notification from the NWCPU 31 (S207). When such a notification is received (S207: YES), and stop releasing the data bus (S208).

Next, the CPU 21 switches the operational statuses of external buffers other than the interruption buffer that monitors the operation of the user and/or reception of the interrupting signal such as a print instruction signal to OFF status (S209). Then, the CPU 21 outputs instructions of lowering the frequency of the clock to the clock generator 24 and other clock generators respectively for the print engine 50, the scanner unit 70 and the facsimile unit 80 (S210).

As described above, when a preparation to transit to the sleep mode is completed, the CPU 21 changes its operation mode to the sleep mode (S211). Then, process proceeds to S212 where a sleep condition procedure is executed.

In S201, when the CPU 21 operates in the normal mode and there is an input to the CPU 21 (S201: YES), process determines whether the input is for requesting the status information coming from the NWCPU 31 (S213). It should be noted that the release request of the data bus from the NWCPU 31 is performed when there is a request for the status information from the LAN 10, and the terminal controller is not in the sleep mode.

When there is a request for the status information coming from the NWCPU 31 (S213: YES), the CPU 21 releases the data bus to the NWCPU 31, and notifies the NWCPU 31 of the release of the data bus (S214). At this stage, the NWCPU 31 obtains the status information stored in the RAM 23 of the main board, and stores the same in the RAM 33. When the NWCPU 31 has completed storing the status information in the RAM 33, transmits the status information acquisition completion notification to the CPU 21. The CPU 21 determines completion of reception of the status information acquisition completion S207, and when the notification is received (S207: YES), completes release of the data bus (S208).

When the input data is not the request for the status information (S213: NO), the CPU 21 executes a process according to the input command (S217). Thereafter, process returns to S200. The command may be the print instruction command. In such a case, the CPU 21 instructs the print engine 50 to carry out the printing operation in accordance with the print data.

<Sleep Condition Procedure>

Figure 11:
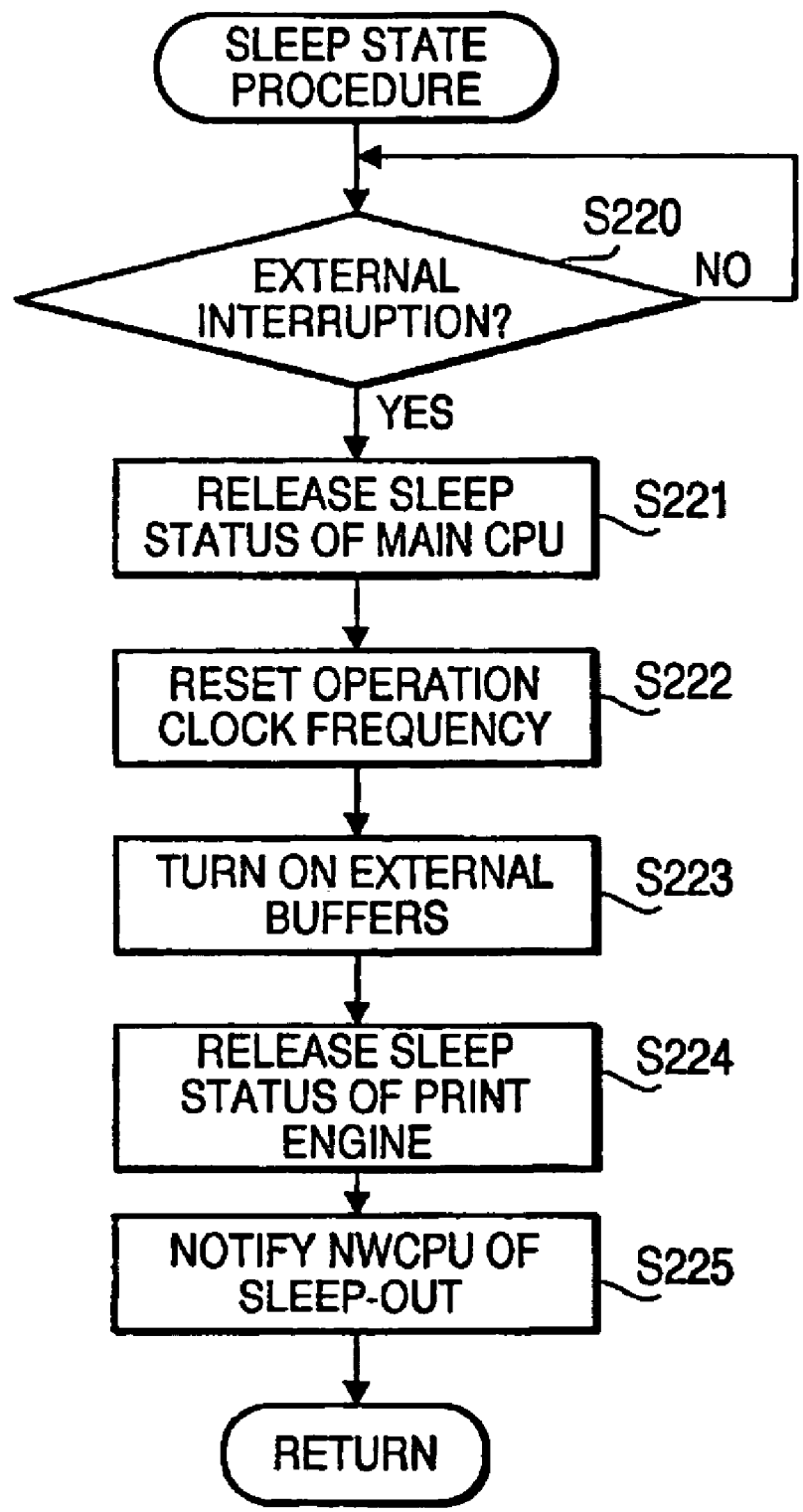
FIG. 11 is a flowchart illustrating a sleep mode procedure according to the second embodiment.

The operation of the CPU 21 when the printer operates in the sleep mode will be described with reference to FIG. 11, which is a flowchart showing the sleep condition procedure executed by the CPU 21.

In S220, the external interruption buffer of the CPU 21 monitors whether an external interruption signal is received from the outside (S220). When no external interruption signal is received (S220: NO), process repeats S220 to continue the monitoring.

When the external interruption signal is received (S220: YES), the CPU 21 restarts itself and starts releasing the sleep condition (S221). Next, the CPU 21 transmits instructions to the clock generator 24 and other clock generators of respective functions units to return the frequencies of the operational clocks to normal values (i.e., values at the normal operation) (S222). Then, the CPU 21 returns the operational statuses of the external buffers to the ON statuses (S223), and instructs to release the sleep condition of print engine 50 (S224). Then, in S225, the CPU 21 notifies the NWCPU 31 that the CPU 21 is recovered from the sleep status (i.e., sleep-out). With this notification of sleep-out, the NWCPU 31 recognizes that the printer is recovered from the sleep condition. Thereafter, process proceeds to S200 shown in FIG. 10.

<Main Procedure of the NWCPU>

Figure 12:
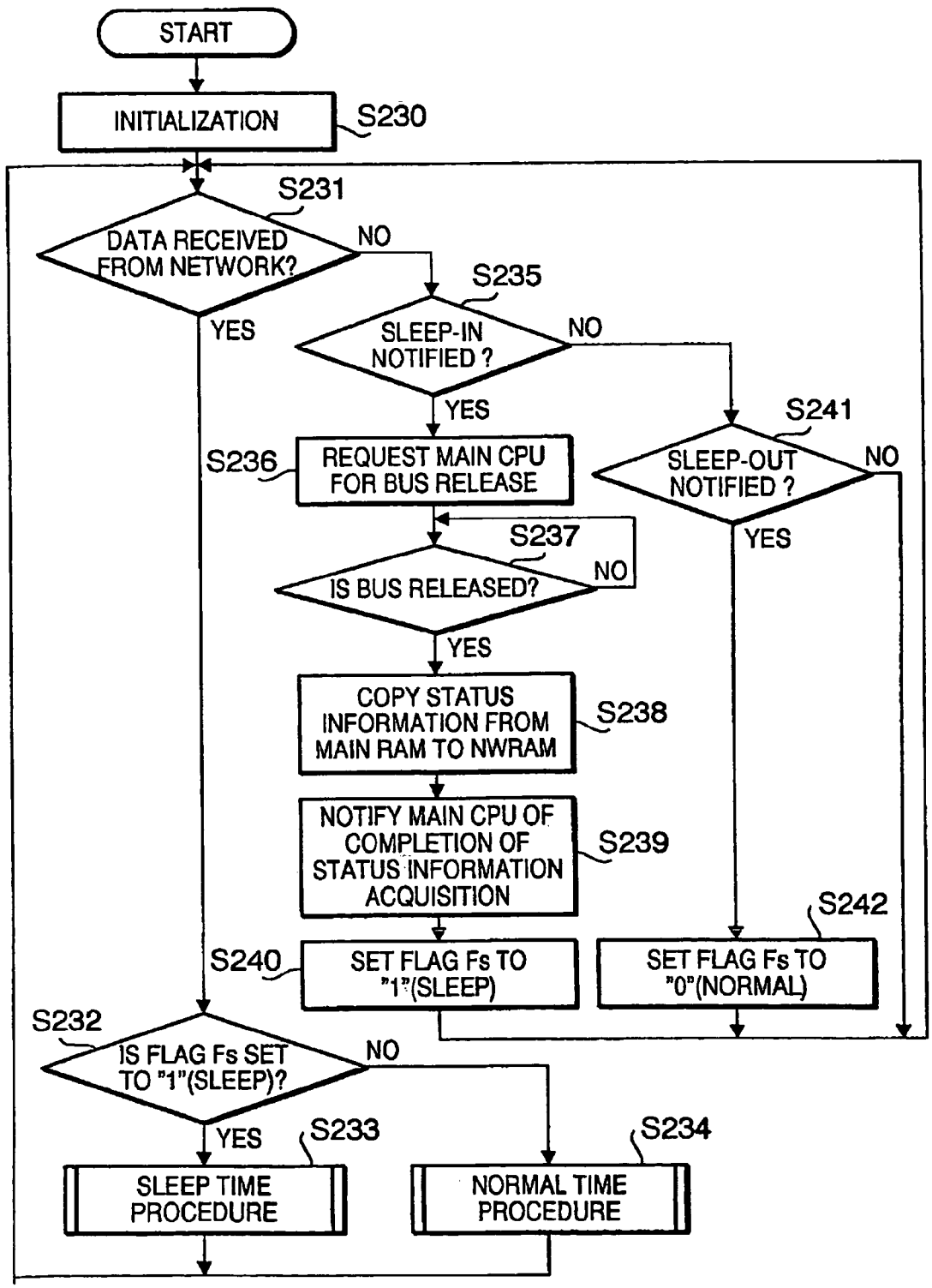
FIG. 12 is a flowchart illustrating a main procedure executed by an NWCPU according to the second embodiment.

A procedure executed by the NWCPU 31 will be described hereinafter. FIG. 12 shows a flowchart illustrating a main procedure executed by the NWCPU 31.

As shown in FIG. 12, the NWCPU 31 executes an initialization of the RAM 33, MAC controller 35 and other devices (S230). At this stage, the NWCPU 31 inquires of the CPU 21 for the operational condition thereof (i.e., whether the CPU 21 operate in the sleep mode). Then, based on the reply to the inquiry, when the CPU 21 is not in the sleep mode, the NWCPU 31 sets the flag Fs in the RAM 33 to zero (0). When the CPU 21 is in the sleep mode, the flag Fs is set to one (1). The flag Fs a flag referred to for determining whether the printer is in the sleep condition, and Fs=0 represents the normal mode, and Fs=1 represents the sleep mode.

Thereafter, the NWCPU 31 determines data such as a request of the status information and/or print data is received from the LAN 10 (S231). Specifically, detection of the data reception from the LAN 10 is performed by the MAC controller 35, and the NWCPU 31 determines whether the data is received based on the output signal of the MAC controller 35.

When the NWCPU 31 determines that data is received from the LAN 10 (S231: YES), process proceeds to a sleep time procedure in S233. When the printer is not in the sleep mode (S232: NO), process proceeds to a normal time procedure in S234.

When the NWCPU 31 determines that no data is received from the LAN 10 (S231: NO), the NWCPU 31 determines whether the sleep-in notification is received from the CPU 21 (S235). When the sleep-in notification has been made by the CPU 21 (S235: YES), the NWCPU 31 requests the CPU 21 for release of the data bus to obtain the latest status information (S236). Then, the NWCPU 31 determines whether the data bus is released based on the notification from the CPU 21 (S237). When the data bus is released (S237: YES), the NWCPU 31 obtains the status information from the RAM 23 via the PCU 21, and stores the status information in the RAM 33 (S238). Thereafter, when the NWCPU 31 finishes writing the status information in the RAM 33, the NWCPU 31 notifies the CPU 21 of completion of the status information acquisition (S239). At this stage, the CPU 21 finishes the release of the data bus in response to the status information acquisition completion notification. Then, the NWCPU 31 sets the flag Fs in the RAM 33 to one (1: sleep) in S240, and process returns to S231.

In S235, when the NWCPU 31 has not received the sleep-in notification (S235: NO), the NWCPU 31 determines whether the sleep-out notification has been received (S241). When the sleep-out notification has been received (S241: YES), the NWCPU 31 sets the flag Fs in the RAM 33 to zero (0: normal) in S242, and process returns to S231.

<Sleep Time Procedure>

Figure 13:
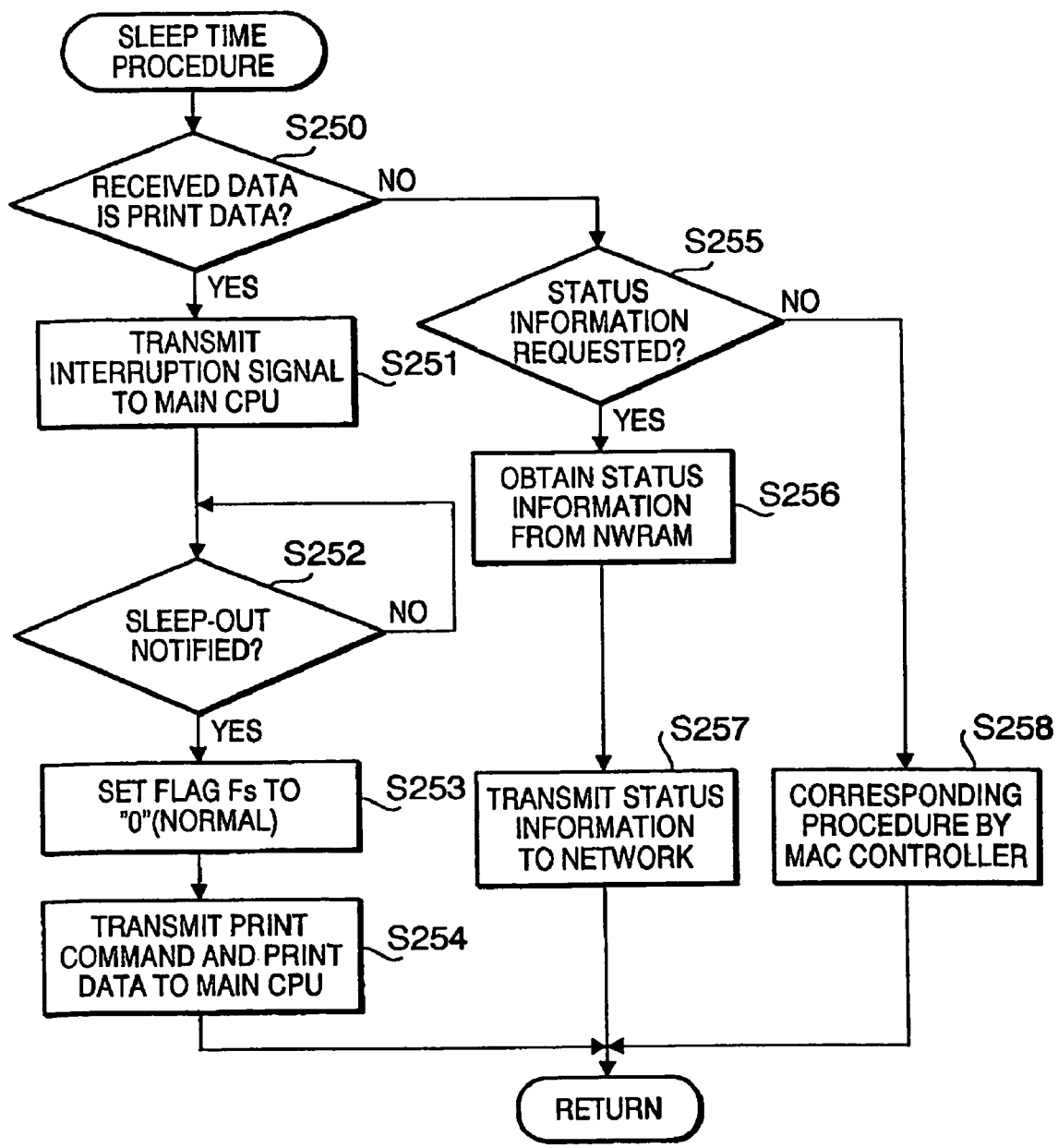
FIG. 13 is a flowchart illustrating a procedure when a main device operates in the sleep mode, according to the second embodiment.

FIG. 13 shows a flowchart illustrating the sleep time procedure which is executed in S233 of FIG. 12.

The NWCPU 31 determines whether the received data is the print data (S250). When the relieved data is the print data (S250: YES), the NWCPU 31 outputs an interruption signal to the CPU 21 so that the CPU 21 is returned from the sleep mode (S251). Thereafter, the NWCPU 31 monitors whether the sleep-out is notified from the CPU 21 (S252).

When the NWCPU 31 recognizes the sleep-out notification (S252: YES), the NWCPU 31 rewrites the flag Fs of the RAM 33 to zero (S253). Then, the NWCPU 31 transmits, to the CPU 21, the print command and print data so that the printing operation is carried by (S254). Thereafter, process proceeds to S231 of FIG. 12.

When the received data is not the print data (S250: NO), the NWCPU 31 determines whether the received data is the request for the status information (S255). When the received data requests for the status information (S255: YES), the NWCPU 31 obtains the status stored in the RAM 33 (S256), and transmits the status information to the LAN 10 via the MAC controller (S257). Thereafter, process proceeds to S231 of FIG. 12.

When the received data is not the request for the status information (S255: NO), the MAC controller performs operations corresponding to the received data (S258). When the operation corresponding to the received data in S258, process proceeds to S231 of FIG. 12.

<Normal Time Procedure>

Figure 14:
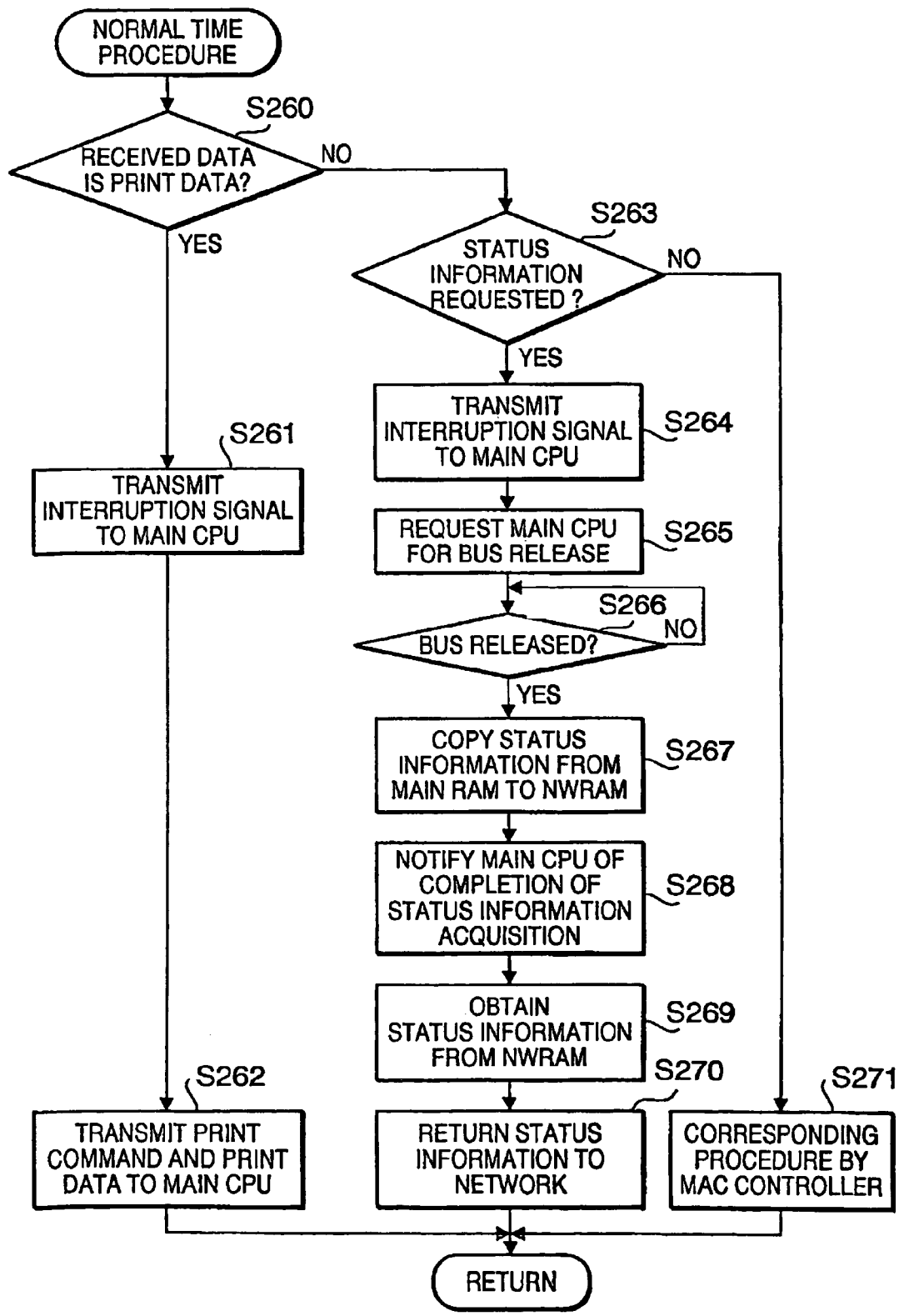
FIG. 14 shows a flowchart illustrating a procedure when the main device operate in a normal mode, according to the second embodiment.

FIG. 14 shows a flowchart illustrating the normal time procedure executed by the NWCPU 31 in S234 of FIG. 12.

The NWCPU 31 determines whether the received data is the print data (S260). When the received data is the print data (S260: YES), the NWPCU 31 transmits the interruption signal to the CPU 21 so that CPU 21 can accepts the command transmitted by the NWCPU 31 (S261). Then, the NWCPU 31 transmits the print command and print data to the CPU 21 so that the CPU 21 carries out the printing operation (S262). Thereafter, process proceeds to S234 of FIG. 12.

When, the received data is not the print data (S260: NO), the NWCPU 31 determines whether the received data requests for the status information (S263). When the received data requests for the status information (S263: YES), the NWCPU 31 transmits an interruption signal to the CPU 21 so that the CPU 21 accepts the commands transmitted by the NWCPU 31 (S264). Then, the NWCPU 31 request the CPU 21 to release the data bus (S265). Thereafter, the NWCPU 31 determines whether the data bus has been released based on the notification from the CPU 21 (S266). When the data bus has been released (S266: YES), the NWCPU 31 obtains the status information from the RAM 33 through the CPU 21, and stores the status information in the RAM 33 (S267). After completion of storing the status information in the RAM 33, the NWCPU 31 notifies completion of the status information acquisition to the CPU 21 (S268). At this stage, the CPU 21 finishes the release of the data bus in response to the status information acquisition completion notification.

Next, the NWCPU 31 obtains the status information stored in the RAM 33 (S269), and transmits the status information to the LAN 10 via the MAC controller 35 (S270). After the transmission of the status information, process proceeds to S231 of FIG. 12.

When the received data is not the request for the status information (S263: NO), operations corresponding to the received data are performed by the MAC controller (S271), and process proceeds to S231 of FIG. 12.

As described in detail above, in the printer 13' employing the status information notification system according to the second embodiment, when the printer operates in a sleep mode, the network board 30 responds to the inquiry of status information from the LAN 10 by transmitting the status information. Therefore, the operation mode of the printer need not be changed to the normal mode (i.e., the sleep mode can be maintained), and the status information can be transmitted. Accordingly, the power consumption is saved. Further, according to the second embodiment, the DPRAM 34 is not necessary, which reduces the manufacturing cost of the printer 13'.

In the status information notification system according to the second embodiment, the operation mode of the PCU 21 is changed to the sleep mode after it receives the notification that the status information has been obtained from the NWCPU 31. Therefore, even though the CPU 21 is in the sleep mode, the NWCPU 31 can provide the status information of the printer when operation mode of the CPU 21 is changed to the sleep mode to the LAN 10.

According to the second embodiment of the status information notification system described above, the terminal controller operates in the sleep mode when the notification that the NWCPU 31 has written the status information has been received. However, the invention need not be limited to such a configuration, and the terminal controller may transit to the sleep mode when it outputs the status information, without receiving the notification from the NWCPU 31.

According to the second embodiment, the NWCPU 31 request the CPU 21 for the release of the bus, and obtains the status information from the RAM 23 when the data bus is released. This may be modified such that the NWCPU 31 directly requests the CPU 21 for the status information, the CPU 21 obtains the status information from the RAM 23, and the CPU 21 transmits the status information to the NWCPU 31 as a reply.

The second embodiment may be modified such that the NWCPU 31 releases the data bus with respect to the RAM 33 and the CPU 21 writes the status information in the RAM 33.

It should be noted that the invention is not limited to the configurations of the above-described exemplary embodiments, and can be modified in various ways without departing from the scope of the invention.

For example, in the embodiments, as a network terminal device, a multi-function printer is described. However, it is only an example, and the terminal device need not be limited to the multi-functional printer. Any other terminal device that can be connected to a network such as the LAN or the Internet, for example, a single function printer or scanner, data processing device such as a personal computer can be used as the network terminal device in the invention.

In the above-described embodiments, the network board provided to the network terminal device is referred to as the communication processing device. However, this is modified such that a communication processing device may be another device separate from the network terminal device.

In the embodiments, when the CPU 21 transmits the status information to the NWCPU 31, it retrieves the status information stored in the RAM 23 and transmits the same. However, the invention need not be limited to such a configuration, and can be modified such that the status information is obtained from each of the function units when the status information is requested by the NWCPU 31 and is output directly without storing the same in the RAM 23.

According to the embodiments, depending on whether the terminal controller is in sleep condition, the terminal controller of a storage is selected, and the status information is obtained therefrom. With this configuration, even if the terminal controller is in the sleep condition, the status information can be obtained without releasing the sleep condition. It should be noted that various modifications may be considered without departing from this scope.

Modification

For example, in the above described first and second embodiments, when the CPU 21 is in sleep condition, the network CPU obtains the status from the DPRAM 34 or RAM 33 without releasing the sleep condition of the CPU 21, thereby the power consumption being suppressed. According to a modification described below, when the status information is requested for, the sleep condition of the CPU 21 will be released, while the sleep condition of the print engine 50 is maintained. That is, only the CPU 21 is awaken and the status information is obtained from the CPU 21 without releasing the sleep condition of the print engine 50.

A system configuration and procedures of the modification are similar to those of the first embodiment, and description thereof will be omitted. It should be noted that, in the modification described herein, the sleep condition procedure (FIG. 5 for the first embodiment) and the sleep time procedure (FIG. 7 for the first embodiment) should be modified, which will be described hereinafter referring to FIGS. 15 and 16, respectively.

<Sleep State Procedure>

Figure 15:
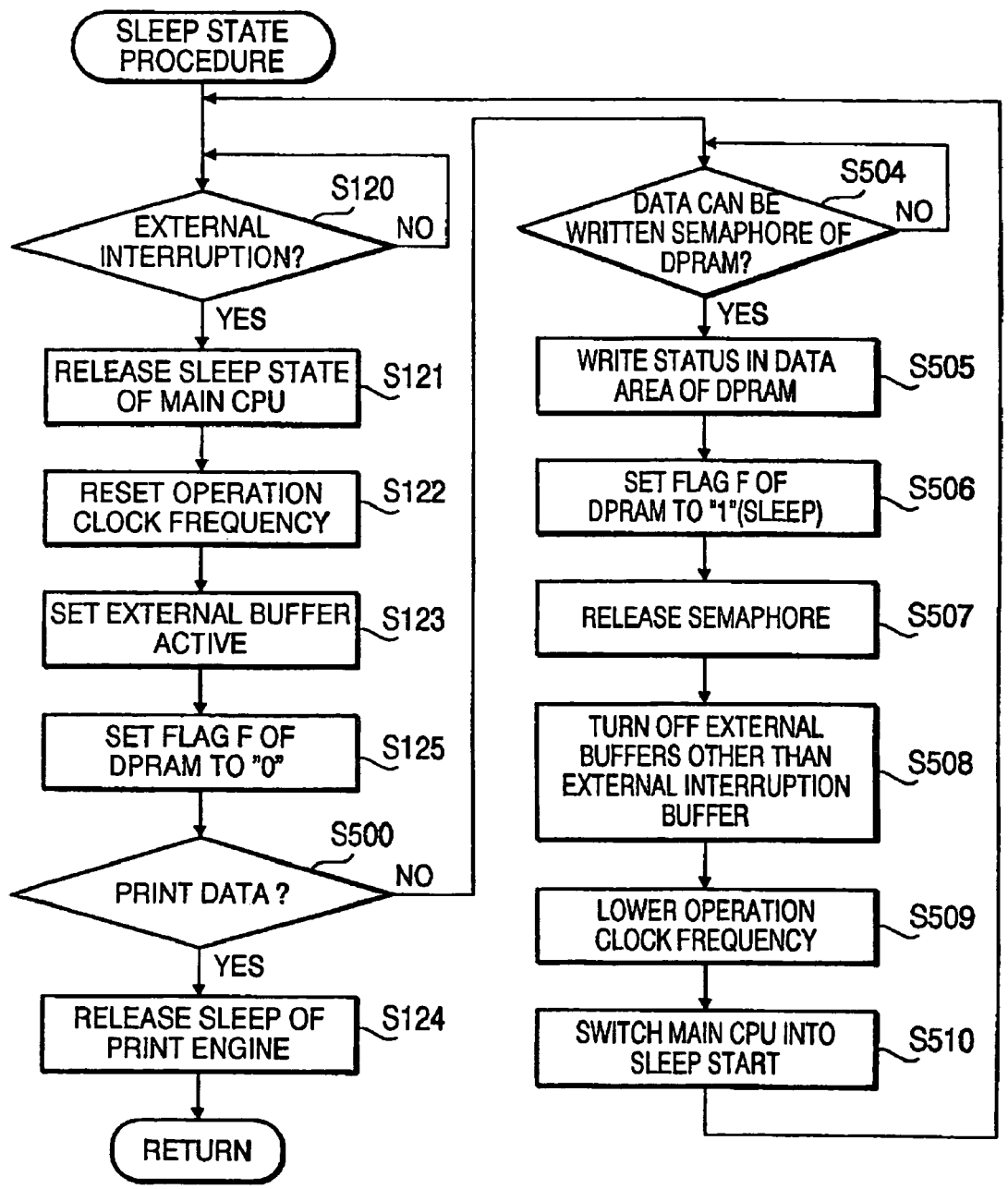
FIG. 15 shows a flowchart illustrating a sleep mode procedure according to a modification of the first embodiment.

FIG. 15 is the sleep state procedure according to the modification of the first embodiment. FIG. 15 illustrates the operation of the CPU 21 when the printer operates in the sleep mode, according to the modification.

Figure 5:
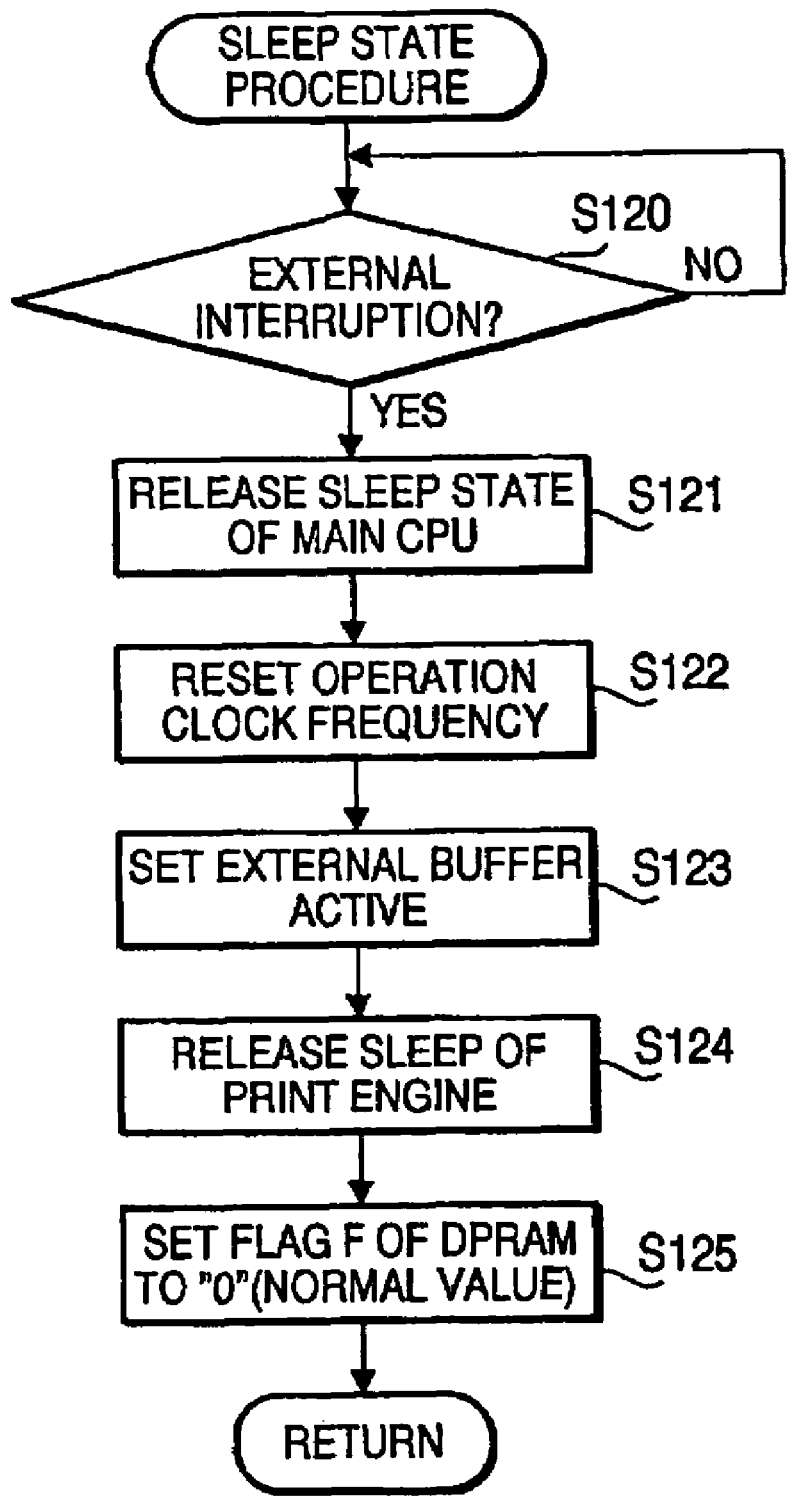
FIG. 5 is a flowchart illustrating a sleep condition procedure according to the first embodiment.

In FIG. 15, steps S120-S125 are similar to those in FIG. 5, except that the order of steps S124 and S125 is reversed and a decision step S500 is inserted between steps S125 and S124. In S500, process determines whether an external interruption signal received from the outside represents print data. When the received signal represents the print data (S500: YES), process releases the sleep condition of print engine 50 (S124). When the received signal does not represent the print data (S500: NO), it is unnecessary to release the sleep condition of the print engine 50, and process proceeds to S504. It should be noted that steps S504-S510 are similar to S104-S110 of FIG. 4.

<Sleep Time Procedure>

Figure 16:
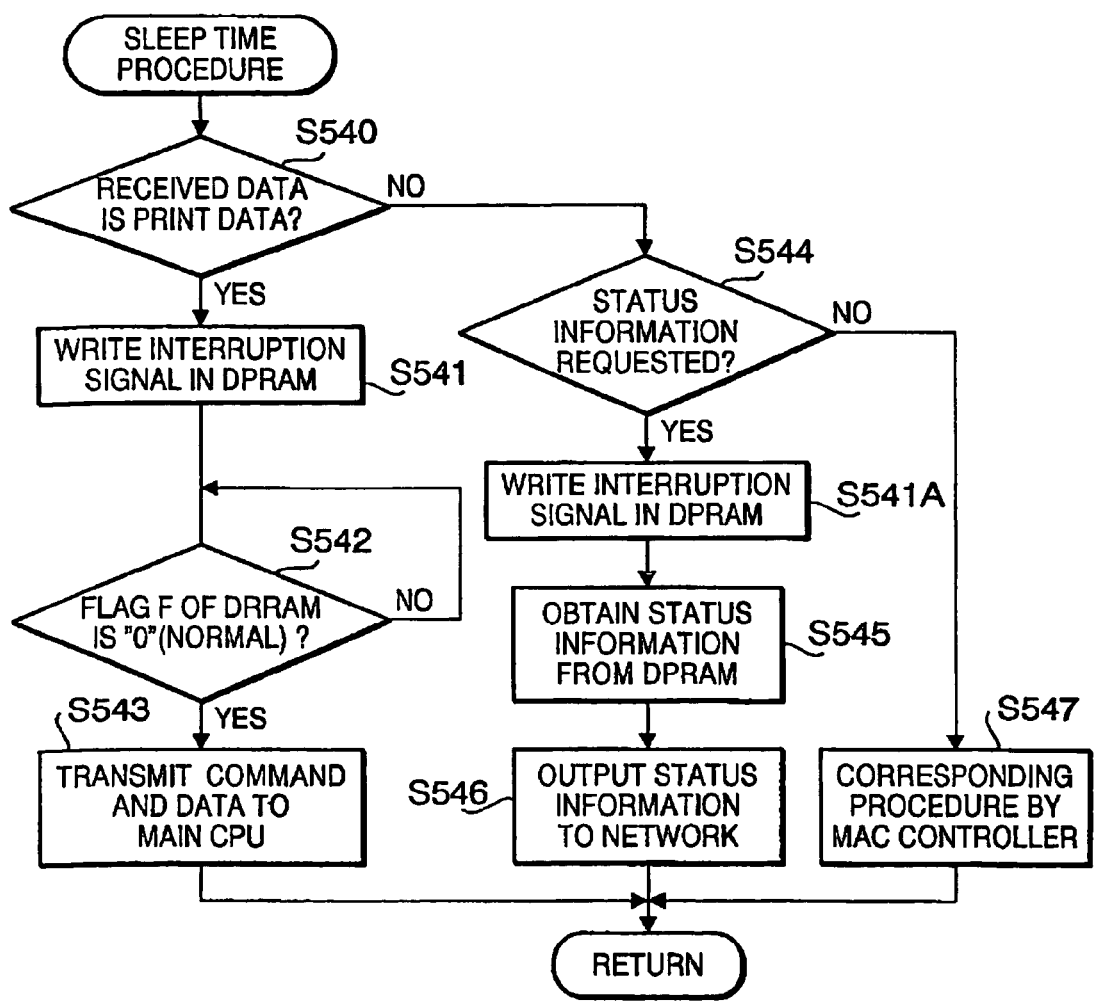
FIG. 16 shows a sleep time procedure according to the modification of the first embodiment.

FIG. 16 shows a flowchart illustrating the sleep time procedure which is executed in S133 of FIG. 6.

Steps S540 through S547 (except S541A) are similar to step S140 through S147 of FIG. 7, respectively. The NWCPU 31 determines whether the received data is the print data (S540). When the relieved data is the print data (S540: YES), the NWCPU 31 writes the interruption signal indicative of the reception of the print data in the command area of the DPRAM 34 (S541). Then, the NWCPU 31 monitors the data area of the DPRAM 34 and determines whether the flag F has been changed to zero (0) by the CPU 21 (S542). It should be noted that when the flag F is rewritten to zero, the operation mode of the printer has been changed from the sleep mode to the normal mode.

When the flag F is changed to zero (S542: YES), the NWCPU 31 writes the print command and print data in the DPRAM 34 (S543) so that the CPU 21 performs an appropriate operation. Thereafter, process moves to S131 of FIG. 6.

When the received data is not the print data (S542: NO), the NWCPU 31 determines whether the received data is the request for the status information (S544). When the received data requests for the status information (S544: YES), the NWCPU 31 writes the interruption signal indicative of the reception of the request for the status information in the command area of the DPRAM 34 (S541A), and then, the NWCPU 31 obtains the status information stored in the data area of the DPRAM 34 (S545), and transmits the status information to the LAN 10 via the MAC controller (S546). Thereafter, process proceeds to S131 of FIG. 6.

When the received data is not the request for the status information (S544: NO), the MAC controller performs operations corresponding to the received data. When the operation corresponding to the received data in S547, process proceeds to S131 of FIG. 6.

As above, according to the modification, when the received data is the request for the status information (S544: YES) as well as when the received data is the print data (S540: NO), the NWCPU 31 writes the interruption signal in the command area of the DPRAM 34 (S541, S541A).

The present disclosure relates to the subject matter contained in Japanese Patent Application No. 2003-278288, filed on Jul. 23, 2003, which is expressly incorporated herein by reference in its entirety.

What is claimed is:

1. A status information notification system including a network terminal device and a communication processing device that enables the network terminal device to communicate with another terminal device though a communication network,
   wherein the network terminal device comprises:
      a terminal controlling system that controls processing of functional units provided to the network terminal device and outputs status information representing operational status of the network terminal device; and
      a sleeping system that lowers a power consumption of the terminal controlling system when a predetermined condition is satisfied, and
   wherein the communication processing device comprises:
      a storing system that stores the status information outputted by the terminal controlling system when the predetermined condition is satisfied;
      a determining system that determines whether the terminal controlling system is in a sleep status;
      an examining system that examines whether a request for the status information is received from the another terminal device; and
      a communication controlling system that obtains the status information from one of the storing system and the terminal controlling system, and transmits the obtained status information to the communication network,
   wherein;
      the communication controlling system obtains the status information from the storing system when the determining system determines that the terminal controlling system is in the sleep status, and outputs the status information to the communication network,
      the communication controlling system obtains the status information from the terminal controlling system when the determining system determines that the terminal controlling system is not in the sleep status, and transmits the status information to the communication network,
      the communications processing device is an internal component of the network terminal device,
      the storing system includes a common storage that is accessible from both the terminal controlling system and the communication controlling system, and
      the sleeping system sets the terminal controlling system in the sleep status when the predetermined condition is satisfied and the terminal controlling system has completed outputting the status information to the common storage.

2. The status information notification system according to claim 1, wherein the communication controlling system is capable of accessing the storing system regardless whether the terminal controlling system is in the sleep status or non-sleep status.

3. The status information notification system according to claim 1, wherein the communication controlling system obtains the status information from the terminal controlling system and stores the obtained status information in the storing system.

4. The status information notification system according to claim 3,
   wherein the communication controlling system includes a completion notification system that notifies a completion notification system notifying that storing the status information in the storing system has been completed to the sleeping system, and
   wherein the sleeping system transits the status of the terminal controlling system to the sleep status when the completion notification is notified from the completion notification system.

5. The status information notification system according to claim 3,
   wherein the terminal controlling system includes:
      a main control system; and
      a terminal storing system that stores the status information every time when the status of the network terminal device changes, and
   wherein the main control system outputs the status information stored in the terminal storing system to the communication controlling system in response to a request from the communication controlling system.

6. The status information notification system according to claim 5,
   wherein the terminal storing system is connected with the main control system with a data bus;
   wherein the main control system releases the data bus in response to a request from the communication controlling system so that the communication controlling system can access the terminal storing system through the data bus, and
   wherein the communication controlling system obtains the status information from the terminal storing system when the main control system releases the data bus.

7. The status information notification system according to claim 1,
   wherein the predetermined condition includes a condition where an input through one of the communication network and an inputting system provided to or the network terminal device is not made for a predetermined time period.

8. The status information notification system according to claim 1,
   wherein the predetermined condition includes a condition where an input instructing a transition into the sleep status is made through one of the communication network and an inputting system provided to the network terminal device.

9. The status information notification system according to claim 1,
   wherein the sleeping system notifies the determining system when the terminal controlling system is set to operate in the sleep status and when the terminal controlling system is set to recover from the sleep status, and
   wherein the determining system determines whether the terminal controlling system operates in the sleep status in accordance with the notification from the sleeping system.

10. The status information notification system according to claim 1,
    wherein the terminal controlling system makes at least one of the functional units operate in the sleep status in which the power consumption is lower than in the normal state when the terminal controlling system transits into the sleep status.

11. The status information notification system according to claim 1,
    wherein the terminal controlling system includes a monitoring system that monitors an interruption signal input to the terminal controlling system from one of the communication network and an input system provided to the network terminal device, and
    wherein the sleeping system makes functions other than the function of the monitoring system to bring the terminal controlling system into an inoperable state.

12. The status information controlling system according to claim 1,
    wherein the sleeping system makes the terminal controlling system recover from the sleep status when the monitoring system detects the interruption signal input to the terminal controlling system.

13. The status information controlling system according to claim 12,
    wherein the network terminal device is a printer, and
    wherein the interruption signal is a print request signal transmitted from the another terminal device.

14. The status information controlling system according to claim 1,
    wherein the terminal controlling system operates synchronously with an operation clock for synchronizing operations among circuits included in the terminal controlling system,
    wherein the terminal controlling system includes an internal clock controlling system that controls a frequency of the operational clock, and
    wherein the internal clock controlling system lowers the frequency of the operation clock when the terminal controlling system is set to the sleep status, the internal clock controlling system recovers the frequency of the operation clock when the terminal controlling system is recovered from the sleep status.

15. The status information controlling system according to claim 14,
    wherein the communication controlling system operates regardless the change of the frequency of the operation clock by the internal clock controlling system of the terminal controlling system.

16. The status information controlling system according to claim 1,
    wherein each of the functional units is provided with a unit clock controlling system that controls, according to instructions of the terminal controlling system, the frequency of the operation clock for synchronizing operations of the circuits in each functional unit, and
    wherein the terminal controlling system instructs the unit clock controlling system of one of the functional units to lower the frequency of the operation clock when entering the sleep status, and to recover the frequency of the operation clock when recovering from the sleep status.

17. The status information controlling system according to claim 1, wherein the communication processing device is provided inside a casing of the network terminal device.

18. A computer readable storage medium embedded with a computer program, the program including instructions that cause a computer system to function as a status information notification system including a network terminal device and a communication processing device that enables the network terminal device to communicate with another terminal device though a communication network,
    wherein the function of the network terminal device comprises:
        a terminal controlling system that controls processing of functional units provided to the network terminal device and outputs status information representing operational status of the network terminal device; and
        a sleeping system that lowers a power consumption of the terminal controlling system when a predetermined condition is satisfied, and
    wherein the function of the communication processing device comprises:
        a storing system that stores the status information output by the terminal controlling system when the predetermined condition is satisfied;
        a determining system that determines whether the terminal controlling system is in a sleep status;
        an examining system that examines whether a request for the status information is received from the another terminal device; and
        a communication controlling system that obtains the status information from one of the storing system and the terminal controlling system, and transmits the obtained status information to the communication network, and
    wherein;
        the communication controlling system obtains the status information from the storing system when the determining system determines that the terminal controlling system is in the sleep status, and outputs the status information to the communication network, and
        the communication controlling system obtains the status information from the terminal controlling system when the determining system determines that the terminal controlling system is not in the sleep status, and transmits the status information to the communication network,
        the communication processing device is an internal component of the network terminal device,
        the storing system includes a common storage that is accessible from both the terminal controlling system and the communication controlling system, and
        the sleeping system sets the terminal controlling system in the sleep status when the predetermined condition is satisfied and the terminal controlling system has completed outputting the status information to the common storage.

* * * * *